United States Patent [19]
Mizue et al.

[11] Patent Number: 5,963,693
[45] Date of Patent: Oct. 5, 1999

[54] OPTICAL DATA LINK AND METHOD OF MANUFACTURING THE SAME

[75] Inventors: Toshio Mizue; Daisuke Takagi, both of Yokohama, Japan

[73] Assignee: Sumitomo Electric Industries, Ltd., Osaka, Japan

[21] Appl. No.: 08/917,388

[22] Filed: Aug. 26, 1997

[30] Foreign Application Priority Data

| Aug. 26, 1996 | [JP] | Japan | 8-223931 |
| Oct. 4, 1996 | [JP] | Japan | 8-264812 |
| Jul. 25, 1997 | [JP] | Japan | 9-200076 |

[51] Int. Cl.$^6$ ................................. G02B 6/43
[52] U.S. Cl. ............................. 385/88; 385/94
[58] Field of Search ........................... 385/88–94

[56] References Cited

U.S. PATENT DOCUMENTS

| 4,410,469 | 10/1983 | Katagiri et al. | 264/1.25 |
| 4,539,476 | 9/1985 | Donuma et al. | 250/227 |
| 4,911,519 | 3/1990 | Burton et al. | 385/14 |
| 5,113,466 | 5/1992 | Acarlar et al. | 385/88 |
| 5,127,071 | 6/1992 | Go | 385/73 |
| 5,175,783 | 12/1992 | Tatoh | 385/93 |
| 5,307,362 | 4/1994 | Tanaka et al. | 372/50 |
| 5,475,783 | 12/1995 | Kurashima | 385/92 |
| 5,606,182 | 2/1997 | Yoshida et al. | 257/99 |
| 5,742,480 | 4/1998 | Sawada et al. | 361/749 |
| 5,784,513 | 7/1998 | Kuribayashi et al. | 385/88 |

FOREIGN PATENT DOCUMENTS

| 0 395 607 | 10/1990 | European Pat. Off. . |
| 7-297479 | 11/1995 | Japan . |
| 96/13065 | 5/1996 | WIPO . |

*Primary Examiner*—Rodney Bovernick
*Assistant Examiner*—Ellen E. Kang
*Attorney, Agent, or Firm*—Pillsbury Madison & Sutro LLP

[57] ABSTRACT

A light-emitting element is mounted on a first conversion element mounting portion prepared on a lead frame and resin-molded by using a mold. In this case, a focusing lens whose optical axis coincides with the major surface of the light-emitting element and a coupling portion in which a sleeve is fitted are integrally molded at once to mold a transmission section and an electronic circuit section. When these member are fixed in housings, and a ferrule holding an optical fiber is inserted in the sleeve fitted in a recess portion of the coupling portion, the optical fiber is optically coupled to the major surface of the light-emitting element. At this time, when the distal end portion of the sleeve is brought into contact with the abutment portion in the coupling portion, the end face of the optical fiber always coincides with the major surface of the light-emitting element, thereby realizing reliable optical axis alignment.

14 Claims, 15 Drawing Sheets

DIRECTION OF P

OPTICAL DATA LINK AND METHOD OF MANUFACTURING THE SAME

BACKGROUND OF THE INVENTION

1. Field of the Invention

The present invention relates to an optical data link which is easy to manufacture, and has high mechanical reliability and high performance, and a method of manufacturing the same.

2. Related Background Art

Conventional optical data links are disclosed in U.S. Pat. Nos. 5,127,073 and 5,475,783, and U.S. patent application Ser. No. 08/552,351, is now issued to U.S. Pat. No. 5,742,480, whose basic Japanese Application Laid-Open number is 8-136,767.

In the optical data link called SSL which is disclosed in U.S. Pat. No. 5,127,071, a lead frame having a board portion on which electronic parts are mounted, and lead pins and a metal optical connector, in which the optical element (light-emitting or light-receiving element) having undergone optical axis alignment with the optical fiber is sealed, are prepared. And the lead frame and the optical connector are integrally formed with a resin.

In the optical data link called Kurashima Model which is disclosed in U.S. Pat. No. 5,475,783, a sleeve and a link housing (side plate) are integrally formed with a resin, and an optical element (light-receiving element) is mounted on a circuit board independently of the sleeve and the link housing. With this structure, optical axis alignment between the optical element and the optical fiber in the sleeve is performed by fitting the circuit board with a predetermined portion of the link housing. In addition, a lens for focusing an optical signal sent from the optical element onto the incident end of the optical fiber is placed in the sleeve. This lens is formed separately from the link housing.

In the optical data link disclosed in U.S. patent application Ser. No. 08/552,351, is now issued to U.S. Pat. No. 5,742,480, an optical element (light-emitting diode or semiconductor laser) having undergone optical axis adjustment is mounted on a board (head portion), and the electronic circuit is mounted on another board (main body portion). These boards are electrically connected by using a flexible printed board. In addition, optical axis alignment between the optical fiber and the optical element is performed by fitting the optical element in element insertion holes formed in sleeves.

Optical axis adjustment between an optical fiber and a light-emitting element in a transmission section and optical axis adjustment between an optical fiber and a light-receiving element in a reception section are critical to an optical data link.

In addition, in an optical data link in which transmission and reception sections are integrally assembled, positional adjustment between the transmission and reception sections is also important. More specifically, in the reception section, it suffices if optical axis alignment between the optical fiber end from which an optical signal emerges and the light-receiving element for receiving the optical signal is performed on the submillimeter order. In contrast to this, in the transmission section, a very high positioning precision on the micron order is required for optical axis alignment between the major surface of the light-emitting element for emitting an optical signal and the optical fiber for receiving the optical signal. As described above, since the positioning precision required for the transmission and reception sections greatly differ from each other, technical difficulty has been posed in realizing an optical data link in which transmission and reception sections are integrally assembled.

In a recent ultra-high-speed optical data link, to satisfy the requirement for fast response characteristics, the light-receiving area of a light-receiving device tends to be decreased, and hence an optical axis alignment precision on the micron order has also been required for the reception section.

In the SSL type optical data link, such positioning adjustment is performed as follows. Optical adjustment between the light-receiving element and the optical fiber and between the light-emitting element and the optical fiber in the metal optical connector is performed with a precision on the micron order while optical coupling between the light-receiving element and the optical fiber and optical coupling between the light-emitting element and the optical fiber are actually monitored. Thereafter, the light-receiving and light-emitting elements are fixed in the metal package by resin sealing, thereby performing positioning between the optical axes of the transmission and reception sections. The positioning precision between the optical axes of the transmission and reception sections is therefore determined by the precision of a mold for resin sealing.

In this positioning adjustment method, however, the metal package is expensive. In addition, when a defect is caused in the resin sealing process, even a normally operating optical connector must be discarded, posing a problem in terms of yield and the like. Furthermore, wire bonding must be used to connect the board portion, on which the electronic circuit is mounted, to the optical connector, and the distance therebetween must be several millimeters or more. The parasitic inductance and the like of the bonding wires therefore adversely affect the high-speed operation of the device.

In the Kurashima Model optical data link, the light-receiving and light-emitting elements are mounted on the board on which the electronic elements constituting the electronic circuit are mounted. This device uses a mechanism of performing macro-positioning of this board and the housing of the optical data link to simultaneously perform optical axis adjustment.

According to this mechanism, the precision between the optical axes is determined by the positioning precision in mounting the light-receiving and light-emitting elements on predetermined portions on the board and the positioning precision in mounting the board on the housing, i.e., the positioning precision at the two positions. For this reason, all the components must be processed with very high precision. A problem is therefore posed in terms of yield and the like. In addition, this mechanism has no means for finely adjusting the positions of the sleeve for holding the optical fiber and the light-receiving and light-emitting elements.

Furthermore, in this mechanism, since the board is mounted on the housing, and the light-receiving and light-emitting elements are mounted on the board, fine adjustment is basically performed at two portions with reference to the housing. For this reason, if an external force acts on the housing, and the housing as the reference mechanically deforms during an operation, an optical axis shift may occur.

Moreover, since the light-receiving and light-emitting elements and the electronic elements are mounted on the same board, the mounting area is limited by the volume of the housing, posing difficulty in realizing high performance by mounting many electronic elements.

In the optical data link disclosed in U.S. patent application Ser. No. 08/552,351, since the board on which the light-receiving and light-emitting elements are mounted is separated from the board on which the electronic elements are mounted, the number of electronic elements mounted is not limited. However, the electronic circuit constituted by the electronic elements must be connected to the light-receiving and light-emitting elements through interconnections. For this reason, the parasitic inductance and the like of the interconnections adversely affect the high-speed operation of the device. In addition, since the respective boards are separated from each other, the number of parts increase, resulting in a deterioration in productivity.

The present invention has been made in consideration of the above problems in the conventional techniques, and has as its object to provide a high-performance optical data link with high mechanical reliability which can be easily manufactured, and a method of manufacturing the same.

SUMMARY OF THE INVENTION

In order to achieve the above object, the present invention is characterized in that a conversion element (one or both of light-receiving and light-emitting elements) for converting one of an optical signal transmitted through an optical fiber and a corresponding electrical signal into the other signal is mounted on a conversion element mounting portion of a lead frame having lead pins electrically connected to one end of the conversion element, and a coupling portion for optically coupling the optical fiber to the conversion element and a focusing portion whose optical axis extends in the direction of the normal to the major surface of the conversion element are integrally molded on the conversion element mounting portion with a first resin for sealing the conversion element.

With this process, optical axis adjustment between the optical fiber and the conversion element is performed by the coupling portion integrally molded with the conversion element and the focusing portion with a resin. Owing to this resin molding, high-precision optical data links can be easily mass-produced. Since one or both of a light-emitting element for a transmission section and a light-receiving element for a reception section are molded on the lead frame with a resin exhibiting light-transmitting characteristics with respect to optical signals, in particular, a high-performance optical data link with high mechanical reliability can be provided. In addition, since the manufacture of an optical data link is facilitated by this molding process, an improvement in productivity can be attained.

Since the coupling portion for optically coupling the optical fiber to the light-emitting or light-receiving element is integrally molded at the same time when the above molding process is performed, an improvement in productivity can be attained, and a high-performance optical data link with high mechanical reliability can be provided.

The lead frame may further include an electronic element mounting portion on which electronic elements constituting an electronic circuit are mounted, and external lead pins for external connection, and the electronic elements may be sealed with a second resin integrally molded on the electronic element mounting portion separately from the first resin molded on the conversion element mounting portion.

According to this structure, an electronic circuit can be formed near the conversion element. Therefore, fast response characteristics can be ensured, and the resultant structure is easy to handle.

In addition, the lead frame may further include a peak or valley portion formed by bending an exposed portion between the first and second resins in the form of a hook with respect to the major surface of the second resin.

This peak or valley portion has the function of absorbing variations in the distance between the first and second resins so high precision can be independently ensured at the connection portion for the optical fiber on the first resin and at the lead pin connection portion on the second resin.

The angle of this hook-like bent portion on the second resin side is preferably larger than 90°. With this structure, as the dimensional margin in fixing the second resin portion to the housing increases, the force acting on the bent portion can be reduced. In addition, within the limited height of the linkage, the length of the bent portion itself and the size of the lead frame itself can be decreased.

The coupling portion may include a sleeve for holding the optical fiber, and an abutment portion conforming to part of the shape of a virtual spherical surface centered on the central portion of the light-receiving surface, of one of the optical fiber and the conversion element optically coupled to each other, which is located on the light-receiving side, and coming into contact with the distal end portion of the sleeve.

According to this structure, when the distal end of the sleeve is brought into contact with the end face of the abutment portion, they are positioned with high precision. As a result, optical alignment between the distal end of the optical fiber in the ferrule inserted in the sleeve and the major surface of the conversion element can be performed with high precision.

The coupling portion may include a sleeve having an end portion conforming to part of the shape of a virtual spherical surface centered on the central portion of the light-receiving surface, of one of the optical fiber and the conversion element optically coupled to each other, which is located on the light-receiving side and holding the optical fiber, and an abutment portion located at a predetermined distance from the major surface of the conversion element and coming into contact with the sleeve.

In this case as well, when the distal end portion of the sleeve is brought into contact with the end face of the abutment portion, they are positioned with high precision. As a result, optical alignment between the distal end of the optical fiber in the ferrule inserted in the sleeve and the major surface of the conversion element can be performed with high precision.

As described above, when the sleeve in which the ferrule having the optical fiber is brought into contact with the abutment portion having a predetermined shape and formed on the coupling portion, the direction of the end face of the optical fiber can always be made to coincide with the direction of the major surface of the conversion element. Therefore, the assembly precision of the optical alignment mechanism itself improves to realize reliable, high-precision optical axis alignment.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

BRIEF DESCRIPTION OF THE DRAWINGS

FIGS. 3 to 6 are views for explaining the manufacturing process for an optical data link according to an embodiment of the present invention, in which FIG. 3 is a plan view showing the shape of a lead frame before a process, which is used for the present invention, FIG. 4 is a sectional view showing the shape of the lead frame in process, FIG. 5 is a plan view showing the state of the lead frame from which unnecessary portions are removed, and FIG. 6 is a sectional view for further explaining the shape of the lead frame in process;

DESCRIPTION OF THE PREFERRED EMBODIMENTS

Figure 1:
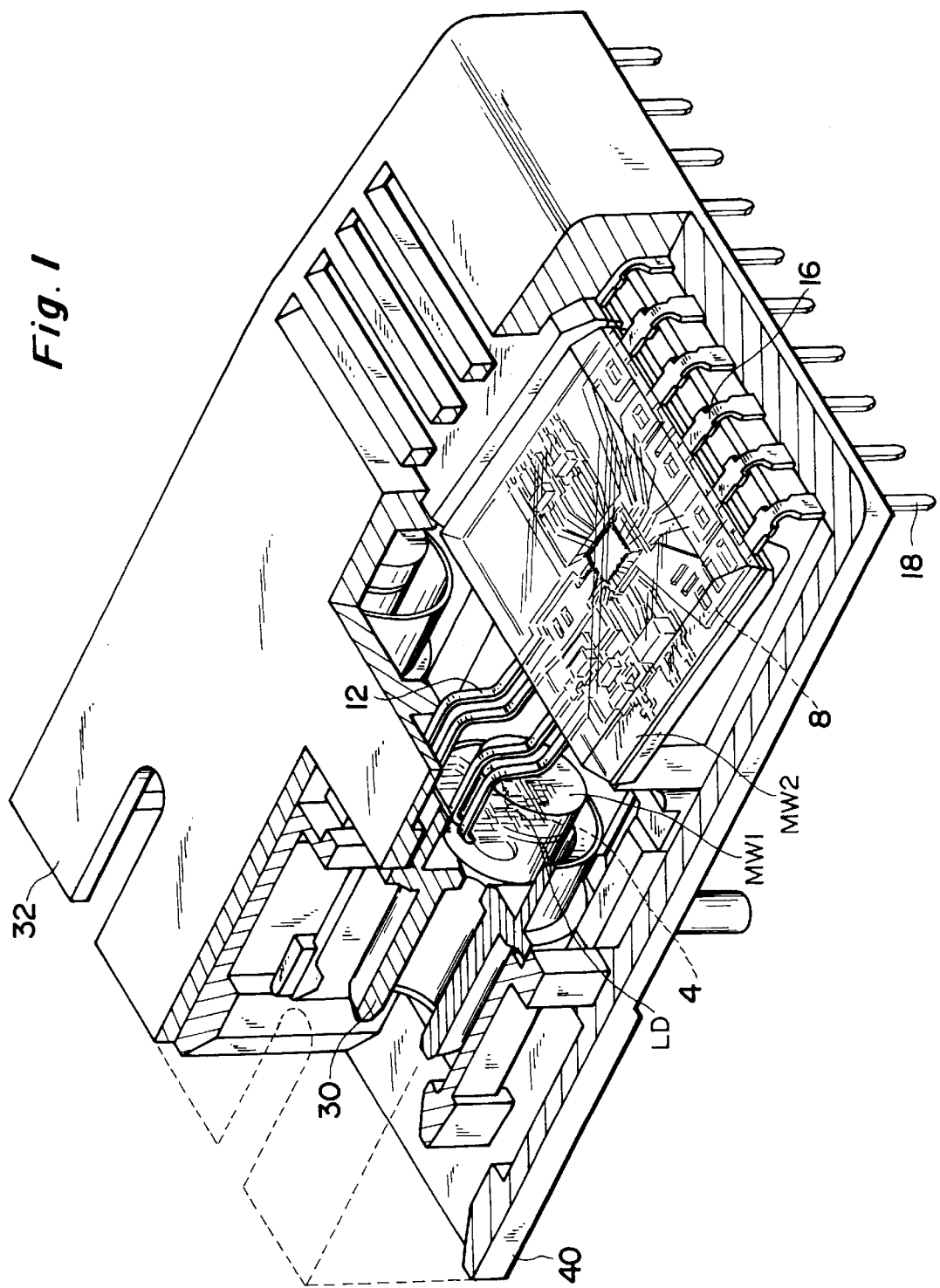
FIG. 1 is a schematic perspective view showing an optical data link according to an embodiment of the present invention.
Figure 2:
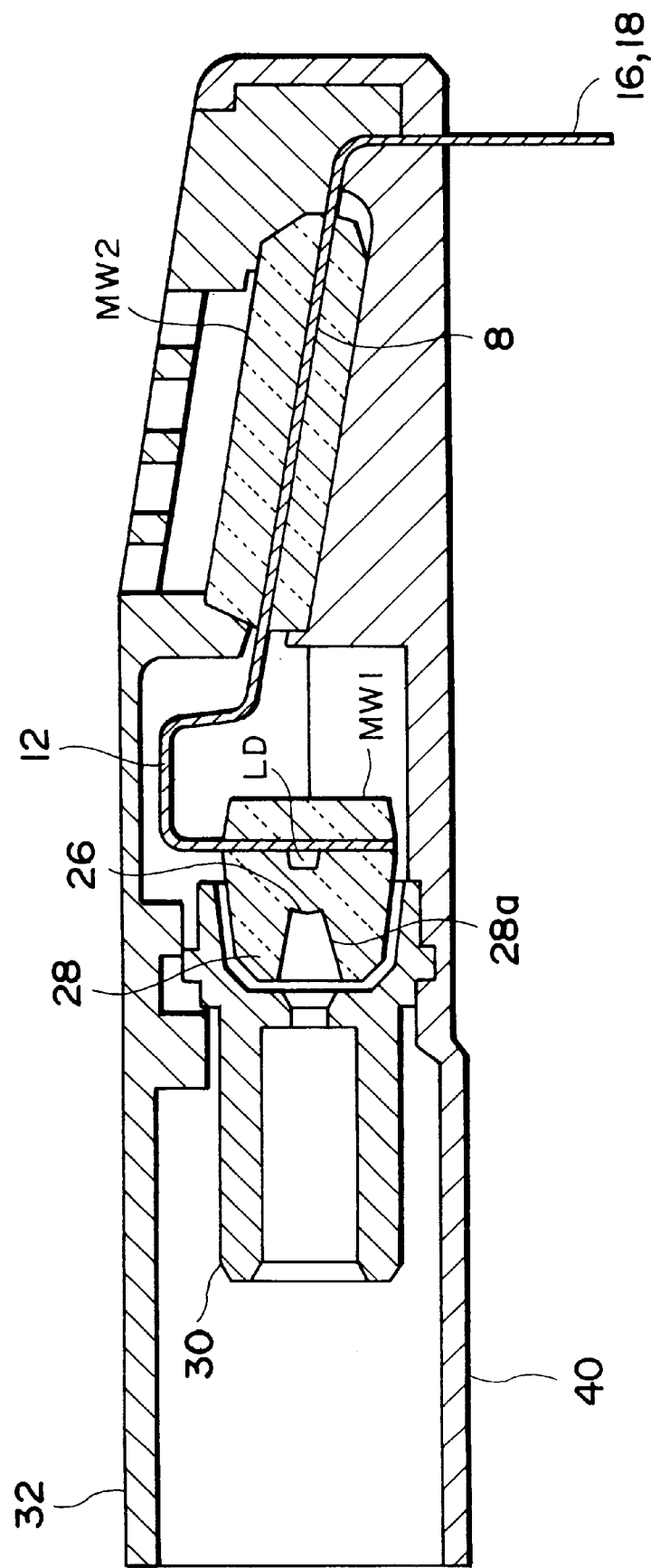
FIG. 2 is a longitudinal sectional view of the optical data link.

An optical data link according to an embodiment of the present invention will be described below with reference to the accompanying drawings. FIG. 1 is a perspective view of the lead frame portion of this optical data link. FIG. 2 is a sectional view showing the structure of the lead frame portion.

As shown in FIGS. 1 and 2, a transmission unit in the present invention is constituted by a transmission section MW1 and an electronic circuit section MW2, each separately molded with a resin to sandwich a lead frame 2. The transmission section MW1 and the electronic circuit section MW2 are arranged such that their major surfaces become perpendicular to each other. A coupling portion 28 for a transmission optical fiber (not shown) is mounted on the front surface (the opposite surface to the surface facing the electronic circuit section MW2). That is, the direction of light emerging from the transmission section MW1 is perpendicular to the major surface of the transmission section MW1 and almost parallel to the major surface of the electronic circuit section MW2. A focusing lens 26 is formed in the coupling portion 28, and a light-emitting element LD is placed closer to the rear surface side than the coupling portion 28. The light-emitting element LD is connected to a conversion element mounting portion 4 of the metal lead frame 2. The transmission section MW1 and the electronic circuit section MW2 are connected to each other through a plurality of lead pins 12 of the lead frame 2. Each lead pins 12 is bent in the form of a hook to form a peak portion between the two sections. These lead pins 12 extend from the transmission section MW1 and the electronic circuit section MW2 in directions parallel to the respective major surfaces. The first bent portion of each lead pin 12 extending from the electronic circuit section MW2 forms an angle larger than 90°, whereas the remaining bent portions of the lead pin 12 form angles of almost 90°. The transmission section MW1 is therefore mounted to be inclined with respect to the optical axis of light incident on the transmission section MW1.

An electronic element mounting portion 8 on which electronic elements and the like constituting an electronic circuit for the light-emitting element LD are mounted is sealed in the electronic circuit; section MW2. Lead pins 16 and 18 for external connection extend from the opposite side of the electronic circuit section MW2 to the lead pins 12. The lead pins 16 and 18 are bent in a direction almost perpendicular to the major surface of the electronic circuit section MW2.

If a light-receiving element PD is mounted in place of the light-emitting element LD, a reception unit can be manufactured. According to these transmission and reception units (the transmission unit in this case), since the lead pins 12 for connecting the transmission section MW1 to the electronic circuit section MW2 are bent, the distance between the transmission section MW1 and the electronic circuit section MW2 can be finely adjusted by the bends.

The transmission unit or the reception unit is fixed in housings 32 and 40, together with a sleeve 30 for fixing a ferrule (not shown) in which an optical fiber is inserted, so as to form an optical data link.

Since the electronic circuit section MW2 is mounted to be inclined with respect to the transmission section (reception section) MW1, the transmission or reception unit can be easily fixed to the housings, and the total length of each lead frame 12 can be decreased. In addition, the stress acting on each lead frame 12 can be reduced.

Figure 3:
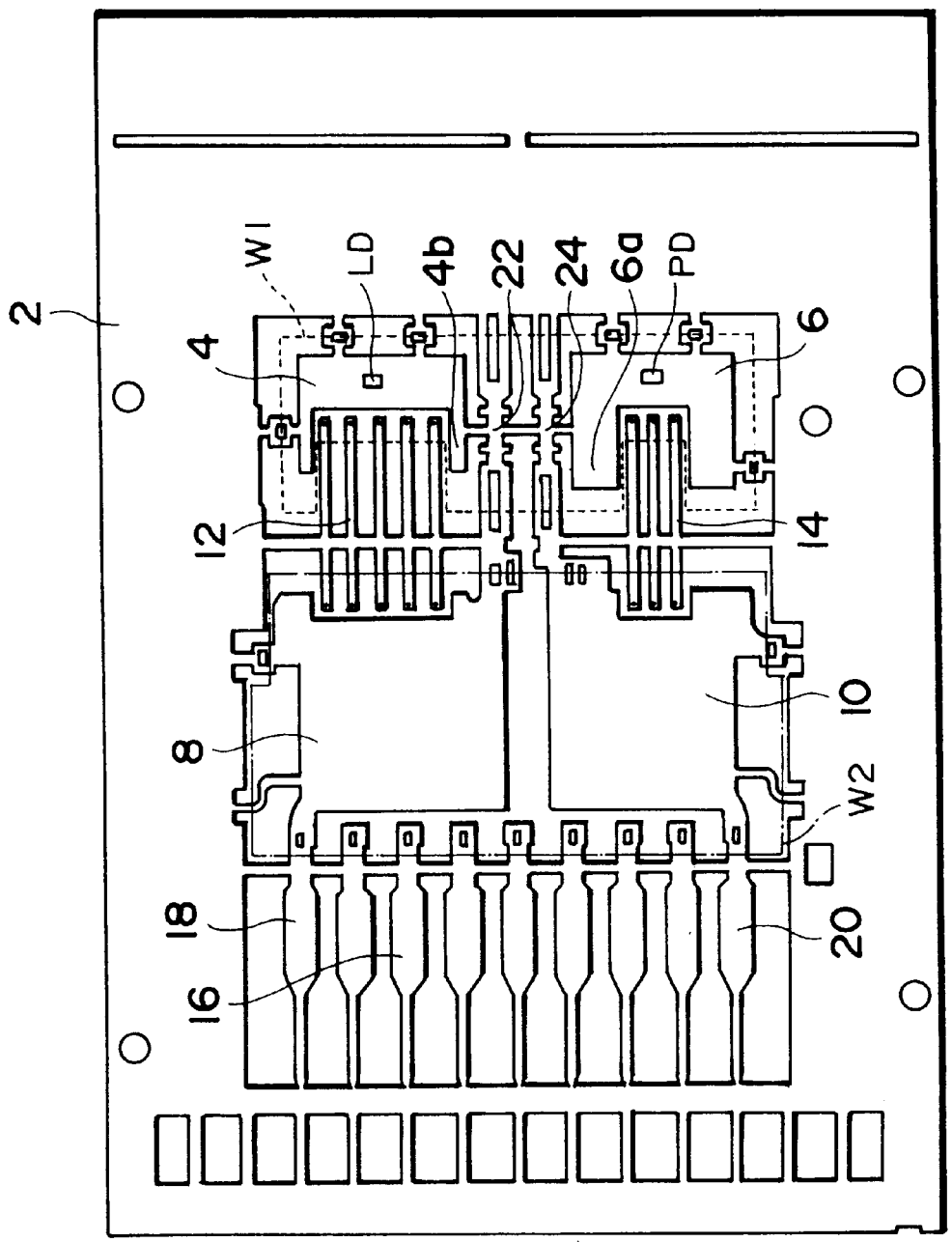
Figure 4:
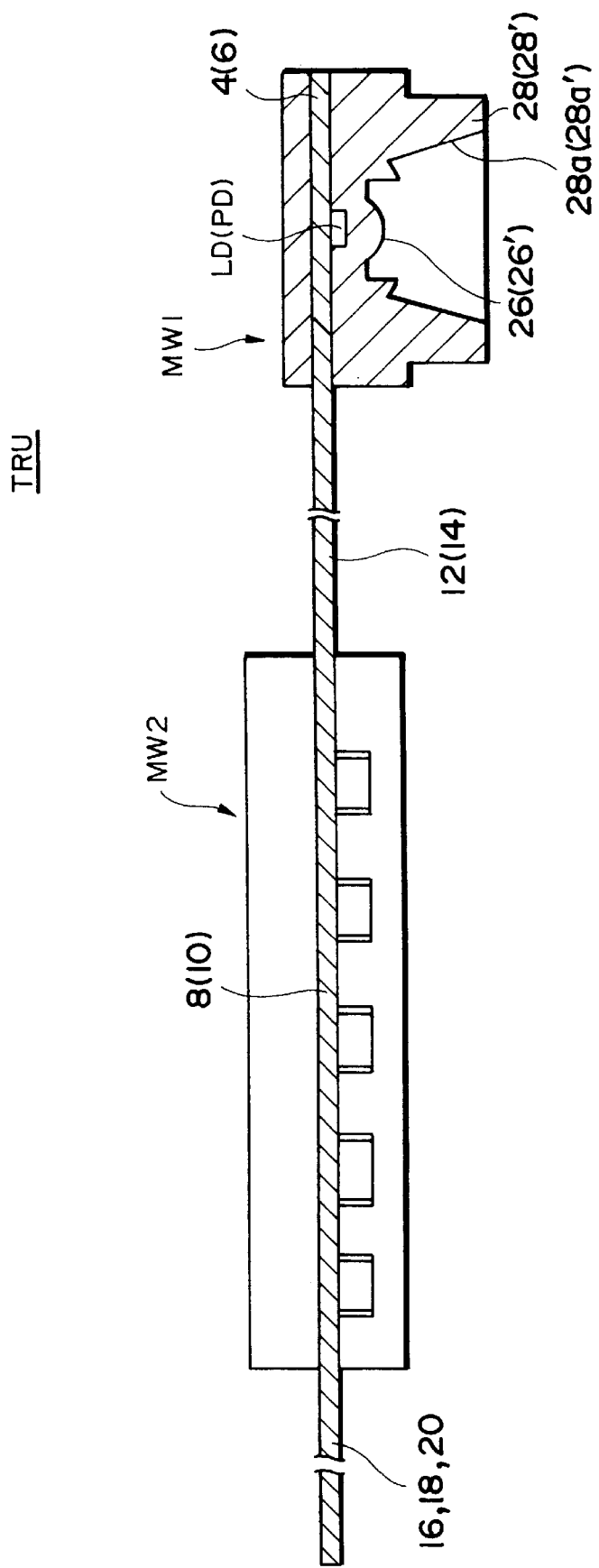
Figure 5:
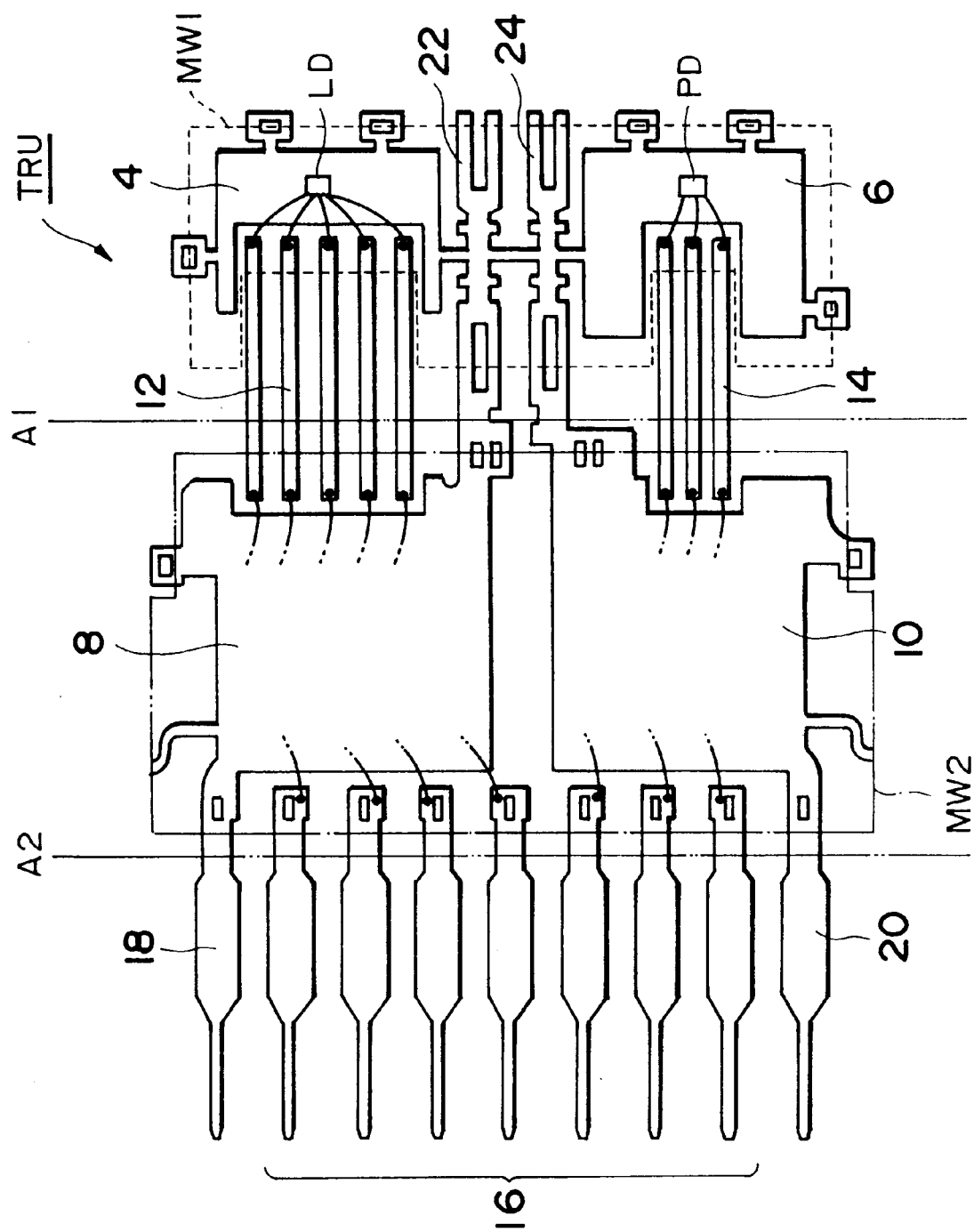

A manufacturing process for this device will be described next. A manufacturing process for a transmission/reception unit TRU obtained by integrating transmission and reception units will be described as an example. FIG. 3 is a plan view showing the state of a lead frame before a process, which is used to manufacture the transmission/reception unit TRU. FIG. 4 is a plan view showing the state of the lead frame in process, from which unnecessary portions are not illustrated. FIG. 5 is a plan view for further explaining the state of the lead frame in process.

The structure of a metal lead frame 2 before the process will be described first with reference to FIG. 3. The lead frame 2 includes a first conversion element mounting portion 4 on which a light-emitting element LD is mounted, a second conversion element mounting portion 6 on which a light-receiving element PD is mounted, a first electronic element mounting portion 8 on which electronic elements constituting an electronic circuit for the light-emitting element LD are mounted, and a second electronic element mounting portion 10 on which electronic elements constituting an electronic circuit for the light-receiving element PD are mounted.

A plurality of (five in this embodiment) lead pins 12 for electrically connecting the electronic circuit formed on the electronic element mounting portion 8 to the light-emitting element LD are arranged between the first conversion element mounting portion 4 and the first electronic element mounting portion 8. A plurality of (three in this embodiment) lead pins 14 for electrically connecting the electronic circuit formed on the second electronic element mounting portion 10 to the light-receiving element PD are arranged between the second conversion element mounting portion 6 and the second electronic element mounting portion 10.

The steps of manufacturing an optical data link by using the lead frame 2 having the above shape will be described next with reference to the accompanying drawings.

Referring to FIG. 3, the light-emitting element LD and the light-receiving element PD are respectively mounted on predetermined portions of the first and second conversion element mounting portions 4 and 6 of the lead frame 2. These conversion elements LD and PD may be directly mounted on the conversion element mounting portions 4 and 6. Alternatively, thin ceramic insulating plates may be mounted on the conversion element mounting portions 4 and 6, and the conversion elements LD and PD may be mounted on these thin insulating plates. Electronic elements such as power-supply bypass capacitors are preferably mounted on predetermined portions of the conversion element mounting portions 4 and 6, e.g., positions near the power-supply lines of the conversion elements LD and PD, altogether, thereby improving the noise characteristics by decreasing the connection distances between the elements.

The so-called bonding pads formed on the light-emitting element LD are electrically connected to the predetermined connection contacts of the lead pins 12 by wire bonding. Similarly, the light-receiving element PD and the lead pins 14 are electrically connected to each other.

Wiring boards, each having a predetermined wiring pattern, and electronic elements are mounted on the first and second electronic element mounting portions 8 and 10. The electronic element mounting portion 8 is electrically connected to the predetermined connection contacts of the lead pins 12 by wire bonding. Similarly, the second electronic element mounting portion 10 is electrically connected to the lead pins 14.

The portion in the range indicated by a dotted line W1 in FIG. 3 is molded with a first resin by using a predetermined mold to integrally resin-seal the bear chips LD and PD, the bonding wires, and the like which are present in the range, together with the first and second conversion element mounting portions 4 and 6. In this case, as the first resin, a resin having light-transmitting characteristics with respect to optical signals used in this optical data link is used. When molding is performed by using this mold (this process will be described in detail later), a focusing lens 26 and a coupling portion 28, which face the major surface of the light-emitting element LD, and a focusing lens 26' and a coupling portion 28', which face the major surface of the light-receiving element PD, are integrally molded with the resin to form a transmission section MW1, as in the case of the transmission unit in FIG. 1.

The portion in the range indicated by a chain line W2 in FIG. 3 is molded with a second resin by using another mold to integrally resin-seal the electronic elements, the bonding wires, and the like which are present in the range, together with the first and second electronic element mounting portions 8 and 10. In this case, as the second resin, a resin having no light-transmitting characteristics, unlike the first resin, is preferably used to shield the electronic elements and the like from external light. In this manner, a resin-molded electronic circuit section MW2 is formed.

In this case, the above two sections are separately molded by using the first and second resins. However, the two sections may be simultaneously molded by using one mold.

Although different resins are used as the first and second resins, the first and second electronic element mounting portions 8 and 10 and the first and second conversion element mounting portions 4 and 6 may be molded together with the first resin. In this case, molding needs to be performed only once. However, the first resin must have light-transmitting characteristics to form the focusing portion 26, as will be described later. In this case, the electronic circuit section MW2 is preferably placed in a housing having light-shielding characteristics to prevent external light from entering the electronic elements sealed in the electronic circuit section MW2.

The structures of the focusing lenses 26 and 26' and the coupling portions 28 and 28' which are molded in the transmission section MW1 with the first resin will be described with reference to FIG. 4. The mold for molding the transmission section MW1 conforms in advance to the shapes of the focusing lenses 26 and 26' and the coupling portions 28 and 28'. When molding is performed by using this mold, the focusing lenses 26 and 26' and the coupling portions 28 and 28' are molded on the conversion element LD side and the conversion element PD side.

Since the focusing lenses 26 and 26' and the coupling portions 28 and 28' respectively have the same shapes, FIG. 4 representatively shows one of the pairs of these components.

The focusing lens 26 is molded such that its optical axis coincides with the light exit end (major surface) of the light-emitting element LD. The coupling portion 28 has a recess portion 28a which gradually decreases in diameter toward the focusing lens 26 to have a conical inner wall. Similarly, the focusing lens 26' is molded such that its optical axis coincides with the light-receiving end (major surface) of the light-receiving element PD. The coupling portion 28' has a recess portion 28a' which gradually decreases in diameter toward the focusing lens 26' to have a conical inner wall. Optical fibers are connected to the coupling portions 28 and 28' by fitting sleeves 30 and 30' (to be described later) in the recess portions 28a and 28a' of the coupling portions 28 and 28'.

As shown in FIG. 5, the portions of the lead frame which protrude from the resin-sealed portions of the transmission section MW1 and the electronic circuit section MW2 are cut at predetermined portions to remove unnecessary portions, and the lead pins 12 and 14 and outer lead pins 16, 18, and 20 are respectively isolated.

Figure 6:
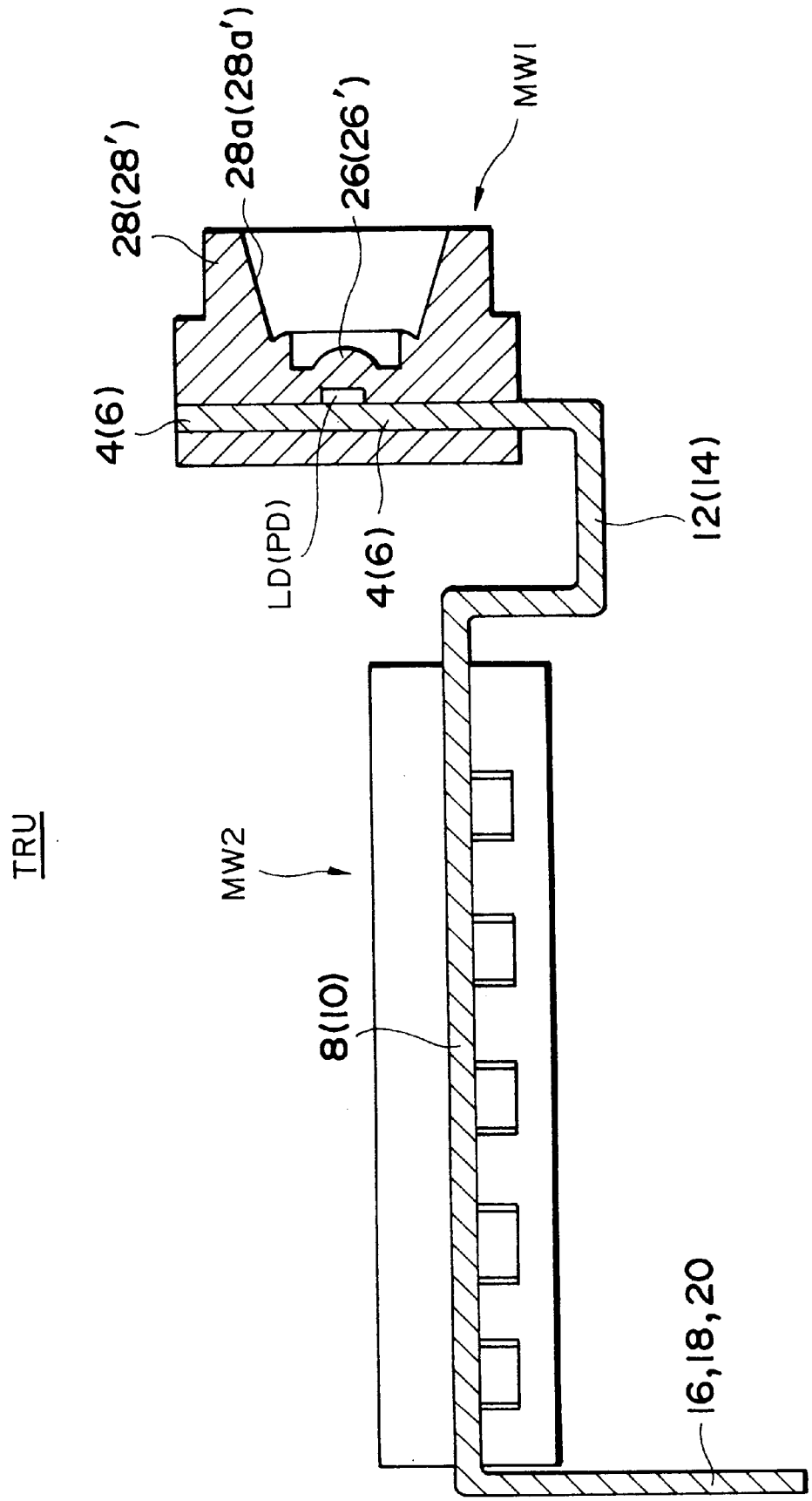

The lead pins 12 and 14 and coupling portions 22 and 24 are bent at three positions in a direction parallel to a chain double-dashed line A1 (see FIG. 5) perpendicular to the longitudinal direction of the lead pins 12 and 14. With this process, as shown in FIG. 6, the conversion elements LD and PD, and the focusing lenses 26 and 26' and the coupling portions 28 and 28', which are molded to face the conversion elements, are directed outward, and the transmission section MW1 becomes perpendicular to the electronic circuit section MW2. In this case, the lead pins 12 and 14 and the coupling portions 22 and 24 form valley portions with respect to the transmission section MW1 and the electronic circuit section MW2. In addition, the external lead pins 16, 18, and 20 are bent along a chain double-dashed line A2 in FIG. 5 in a predetermined direction.

By performing predetermined molding and bending processes and the like with respect to the lead frame 2 in this manner, the transmission/reception unit TRU is formed, which includes the transmission section constituted by the constituent elements molded on the first and second conversion element mounting portions 4 and 8 and the reception section constituted by the constituent elements molded on the first and second conversion element mounting portions 4 and 6.

Figure 7:
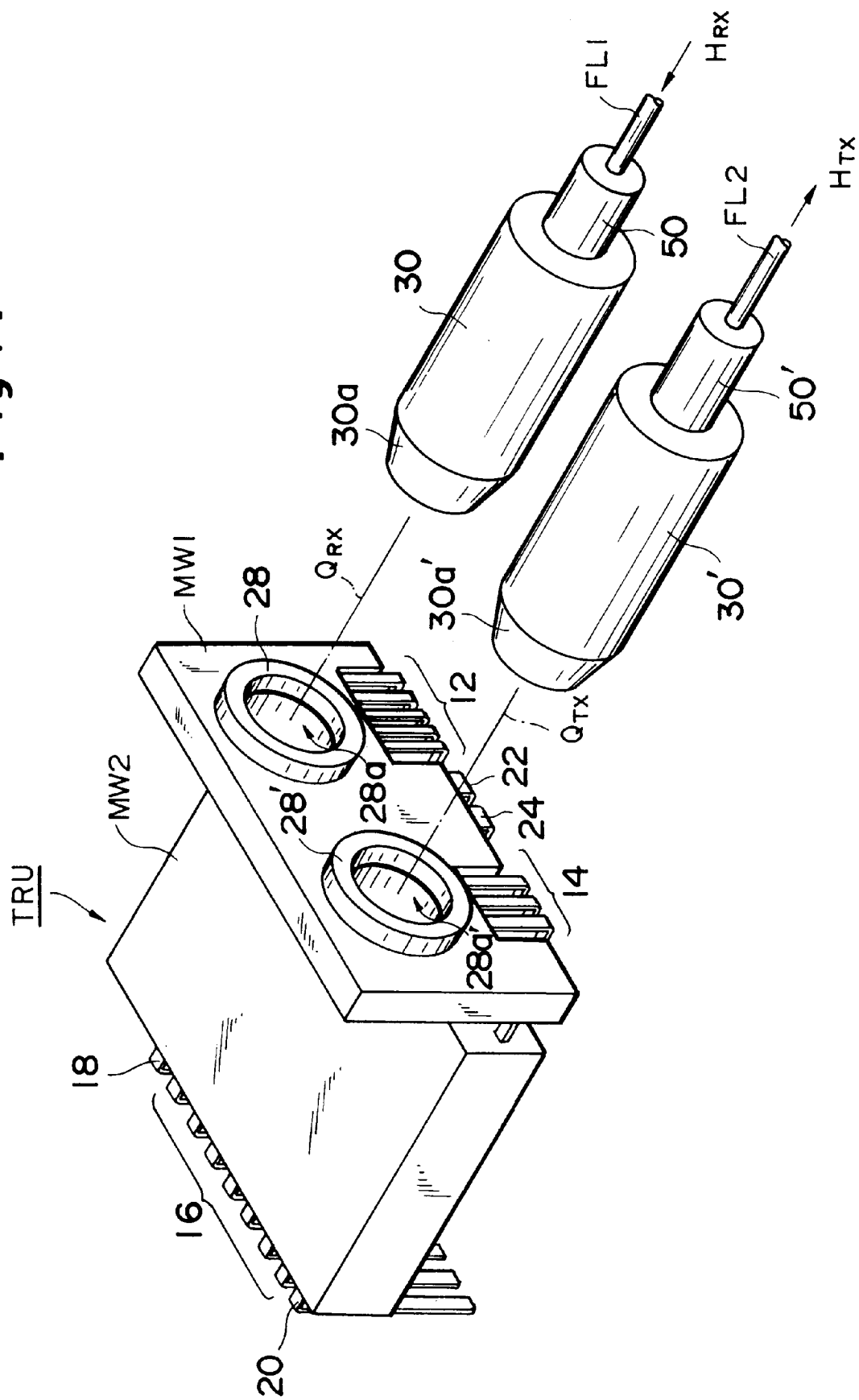
FIG. 7 is a perspective view showing the transmission/reception unit of the device in FIG. 3.

As shown in FIG. 7, distal end portions 30a and 30a' of the sleeves 30 and 30' to which optical fibers FL1 and FL2 are fixed through ferrules 50 and 50' are attached to the coupling portions 28 and 28' integrally formed with the transmission section MW1 of the transmission/reception unit TRU.

Figure 8:
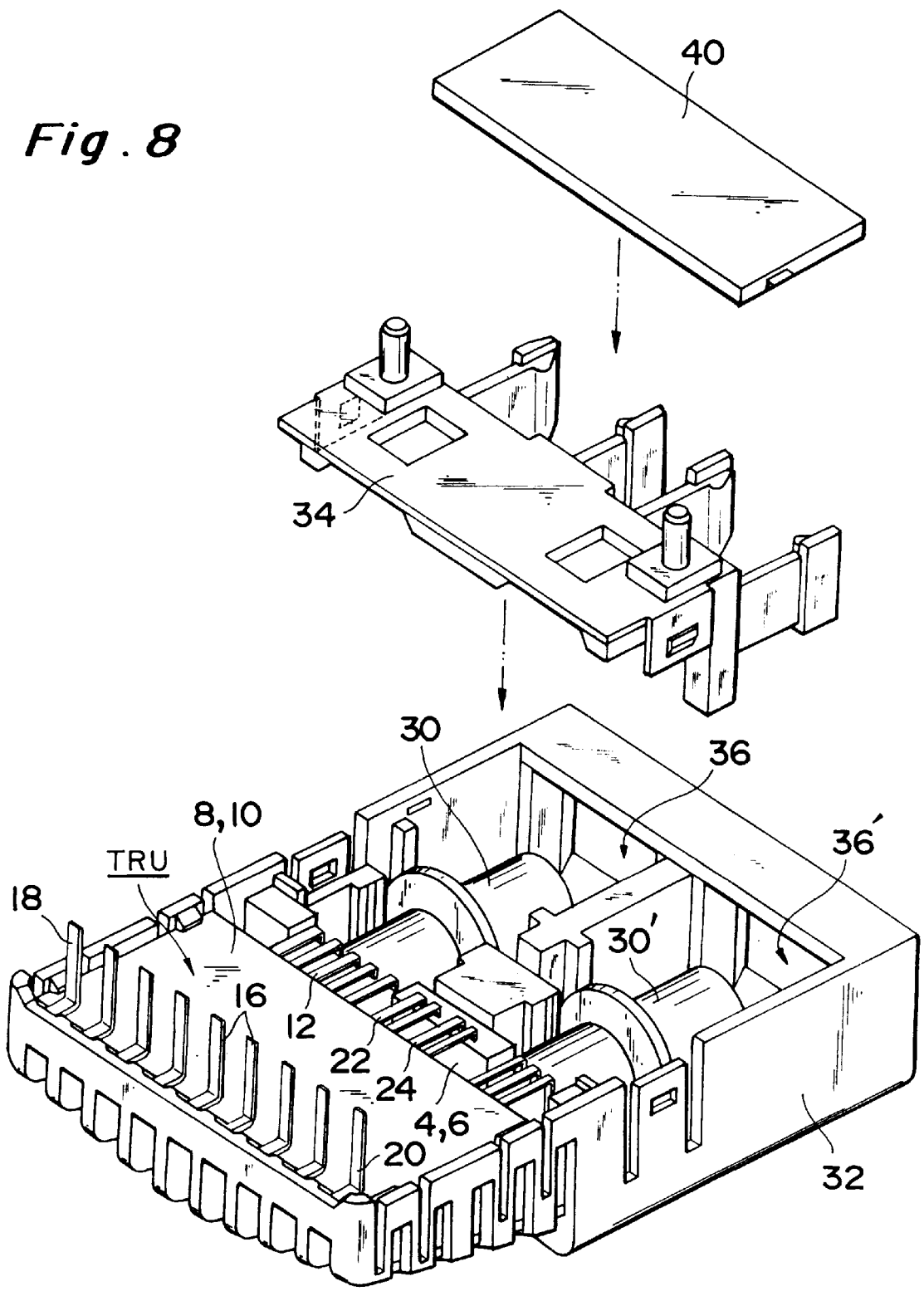
FIG. 8 is a perspective view showing the structure of the optical data link.

Subsequently, as shown in FIG. 8, the transmission/reception unit TRU and the sleeves 30 and 30' are mounted in a housing 32 of the optical data link. The housing 32 incorporates fitting portions which are fitted with the sleeves 30 and 30' to fix them, and engaging and fitting portions which are engaged and fitted with predetermined end portions of the transmission/reception unit TRU. With these engaging and fitting portions, the transmission/reception unit TRU and the sleeves 30 and 30' are fixed at predetermined positions in the housing 32. In addition, a holder 34 which has a predetermined shape to be fitted with the side walls of the sleeves 30 and 30' and the inner wall of the housing 32 is mounted in the housing 32, thereby preventing mechanical positional shifts and the like of the sleeves 30 and 30' more reliably.

Openings 36 and 36' are formed in advance in the side end of the housing 32 on the rear side of the sleeves 30 and 30' (on the side on which the ferrules 50 and 50' are inserted) so that the ferrules 50 and 50' in which the optical fibers FL1 and FL2 are inserted can be fitted in the center holes in the sleeves 30 and 30' from outside the housing 32 through the openings 36 and 36'. With this structure, signal light $H_{RX}$ transmitted through the optical fiber FL1 can be received by the light-receiving element PD, and signal light $H_{TX}$ emerging from the light-emitting element LD can be transmitted through the optical fiber FL2. When a rectangular, flat bottom plate 40 is fixed to the bottom end of the housing 32, the optical data link is complete.

According to the optical data link having the above structure, the light-emitting element LD and the light-receiving element PD are integrally molded on the predetermined mounting portions 4 and 6 of the lead frame, and at the same time, the coupling portions 28 and 28', in which the sleeves 30 and 30' are fitted, are integrally molded, thereby reliably preventing the relative positions of the conversion elements LD and PD and the coupling portions 28 and 28' from shifting from each other. In addition, since the sleeves 30 and 30' are mounted in the housing 32 while the sleeves 30 and 30' are fitted in the integrally molded coupling portions 28 and 28', the positioning precision between the sleeves 30 and 30', the coupling portions 28 and 28', and the major surfaces of the conversion elements LD and PD improves. When, therefore, the ferrules holding the optical fibers are fitted in the sleeves 30 and 30', the optical coupling between the optical fibers and the major surfaces of the conversion elements LD and PD is ensured, and mechanical positional shifts can be reliably prevented.

In addition, since the focusing lenses 26 and 26' and the coupling portions 28 and 28', which are formed to face the conversion elements LD and PD, are integrally molded with a resin having light-transmitting characteristics with respect to optical signals, optical signals can be received/transmitted from/to the optical fibers, posing no problems in optical communication.

In addition, since the transmission and reception sections are integrally molded on the lead frame with a resin, an optical data link can be easily manufactured, and an improvement in productivity can be attained as compared with a case in which the respective components are formed with high precision and assembled into a high-precision optical data link.

In above embodiment, the transmission/reception unit TRU include both light-emitting element and light-receiving element. Although transmission unit having light-emitting element and reception unit having light-receiving element may be supplied. These transmission and reception unit are built in the same body together as shown in FIG. 1. Or each units may be built in separate bodies.

Various forms of combinations of the coupling portions 28 and 28' and the sleeves 30 and 30' are applicable as optical alignment mechanisms on the reception and transmission section sides of the transmission/reception unit TRU. Several preferred forms of these forms will be described below.

The structure of an optical axis alignment mechanism on the reception section side which is realized by the coupling portion 28 on the reception section side and the sleeve 30 attached thereto will be described first with reference to FIGS. 9A to 9D.

Figure 9A:
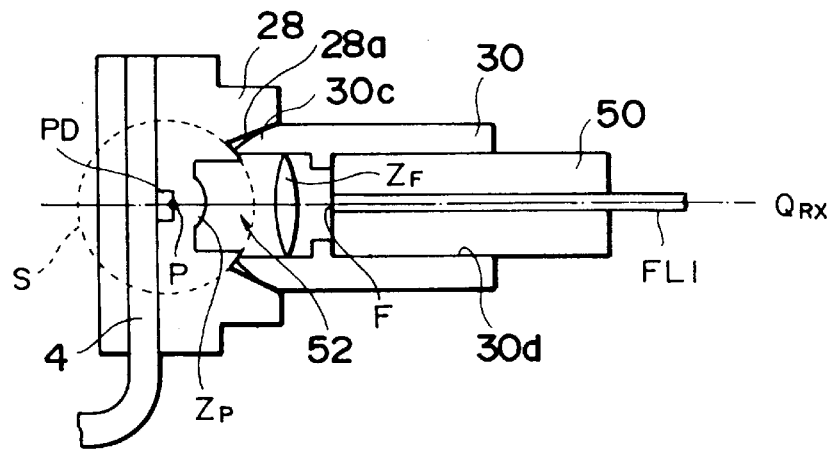
FIGS. 9A to 9D, 10A, 10B, 11A, 11B, and 12 to 18 are views for explaining modifications of the reception-side optical axis alignment mechanism of the optical data link of the present invention.
Figure 9B:
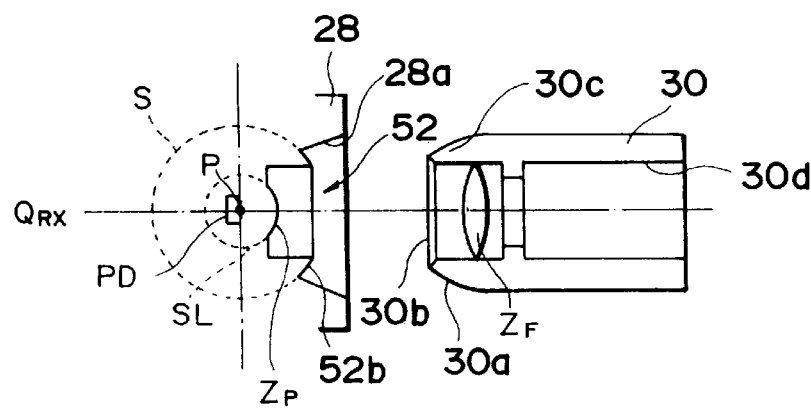

FIG. 9A is a sectional view showing a state in which a distal end portion 30c of the sleeve 30 is fitted in a fitting recess portion 52 formed in the coupling portion 28, and the ferrule 50 is placed in a receiving hole 30d formed in the axial center of the sleeve 30. This sectional view is taken along the direction of an optical axis $Q_{RX}$ perpendicular to the light exit surface (major surface) P of the light-receiving element PD facing the coupling portion 28 in FIG. 7. FIG. 9B is a sectional view showing the main part of the structure in which the coupling portion 28 and the sleeve 30 are separated from each other.

Referring to FIGS. 9A and 9B, the coupling portion 28 has the fitting recess portion 52 in which the distal end portion 30c of the sleeve 30 is to be fitted, and a focusing lens $Z_P$ whose optical axis $Q_{RX}$ coincides with the major surface P of the light-receiving element PD is integrally molded with the coupling portion 28 on the bottom end portion of the fitting recess portion 52 in the resin molding process. This focusing lens $Z_P$ is a lens which is molded in alignment with a virtual spherical surface SL centered on the central portion of the major surface P and has a convex shape toward the opening side of the fitting recess portion 52.

The inner wall of the fitting recess portion 52 is molded into the conical tapered inner surface 28a such that the inner diameter of the recess portion centered on the optical axis $Q_{RX}$ gradually decreases toward the major surface P of the light-receiving element PD. An annular abutment portion 52b is molded on the inner termination of the tapered inner surface 28a so as to conform to part of a virtual spherical surface S centered on the central portion of the major surface P and having a predetermined radius, and the center of the annular abutment portion 52b also coincides with the optical axis $Q_{RX}$. That is, the abutment portion 52b is concentric with the optical axis $Q_{RX}$, and has an outwardly protruding convex cross-sectional shape conforming to part of the virtual spherical surface S.

The outer wall of the distal end portion 30c of the sleeve 30 is formed into a conical tapered outer surface 30a so as to conform to the shape of the tapered inner surface 28a, and a distal end 30b of the distal end portion 30c is tapered in a conical form to be in line-contact with the abutment portion 52b. That is, the tapered surface of the distal end 30b is concentric with the center axis of the sleeve receiving hole 30d formed in the sleeve 30, and has a conical shape which gradually decreases in inner diameter toward the receiving hole 30d side. Note that the tapered surface of the distal end 30b has a flat cross-sectional shape, which is not bent like the abutment portion 52b.

In addition, as shown in FIG. 9A, a focusing lens $Z_F$ for focusing the signal light $H_{RX}$ from the optical fiber FL1 is fixed to the distal end portion 30c of the sleeve 30 in advance.

In the assembly process for the optical axis alignment mechanism having the above structure, when the sleeve distal end portion 30c is fitted in the fitting recess portion 52, and the distal end 30b is brought into contact with the abutment portion 52b with a relatively large force, the distal end 30b is substantially brought into line-contact with the abutment portion 52b in an annular form. As a result, the center axis of the sleeve 30 coincides with the direction of the major surface P of the light-receiving element PD. When, therefore, the ferrule 50 is fitted in the receiving hole 30d, a light exit end F of the optical fiber FL1 coincides with the direction of the major surface P of the light-receiving element PD. As a result, optical axis alignment between the optical fiber FL1 and the light-receiving element PD is attained.

Figure 9C:
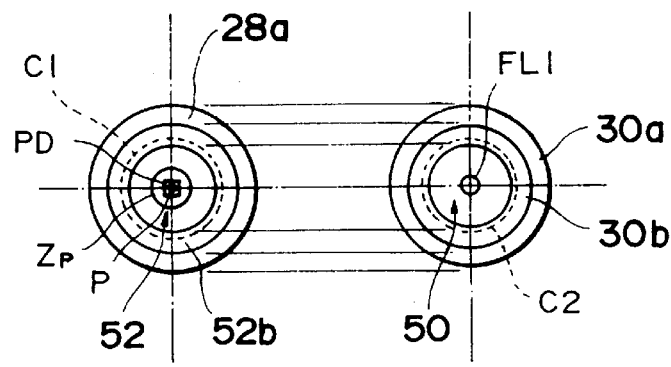

The principle of attaining optical axis alignment between the optical fiber FL1 and the light-receiving element PD will be described in detail below with reference to FIGS. 9C and 9D. The left side of the FIG. 9C shows the inner shape of the fitting recess portion 52 centered on the optical axis $Q_{RX}$ when viewed from the opening side. The right side of the FIG. 9C shows the shape of the sleeve 30 centered on the optical axis $Q_{RX}$ when viewed from the distal end portion 30c side.

The entire surface of the abutment portion 52b of the fitting recess portion 52 is spaced equidistantly from the major surface P of the light-receiving element PD, and is molded to be concentric with the major surface P and the optical axis $Q_{RX}$ of the focusing lens $Z_P$. The distal end 30b of the sleeve 30 is molded to be concentric with the center axis of a ferrule receiving hole 54. When, therefore, the sleeve distal end 30b is brought into contact with the abutment portion 52b, they are substantially brought into line-contact with each other at dotted circles C1 and C2 in FIG. 9C. FIG. 9D is an enlarged sectional view of the contact portion between them. The direction in which the contacting force of the sleeve distal end 30b acts on the abutment portion 52b coincides with the direction of the major surface P of the light-receiving element PD. As a result, the center axis of the receiving hole 30d of the sleeve 30 coincides with the direction of the major surface P of the light-receiving element PD. Consequently, the distal end F of the optical fiber FL1 of the ferrule 50 fitted in the receiving hole 30d is always directed to the major surface P, optical axis alignment can be reliably attained.

As described above, since the abutment portion 52b is molded to conform to part of the virtual spherical surface S centered on the major surface P and having a predetermined radius, the distal end 30b of the sleeve 30 is always positioned at a predetermined distance (the radius of the virtual spherical surface) from the major surface P, the distance (optical path length) between the optical fiber FL1 and the major surface P is kept constant. For this reason, variations in the optical path length between the optical fiber FL1 and the light-receiving element PD are prevented to realize high-precision optical axis alignment.

According to this optical axis alignment mechanism for the reception side, the precision with which the sleeve 30 is attached to the coupling portion 28 can be improved, thereby attaining reliable optical axis alignment between the light-receiving element PD and the optical fiber FL1.

Several modifications of this optical axis alignment mechanism will be described next.

Figure 9D:
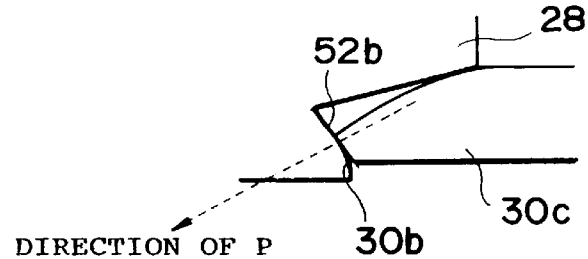
Figure 10A:
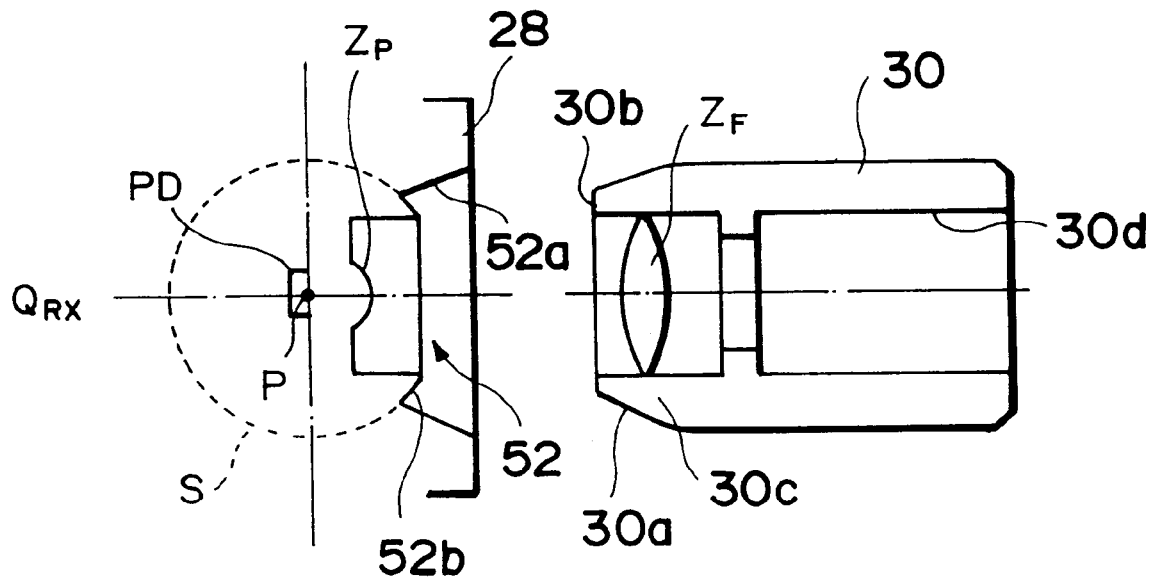
Figure 10B:
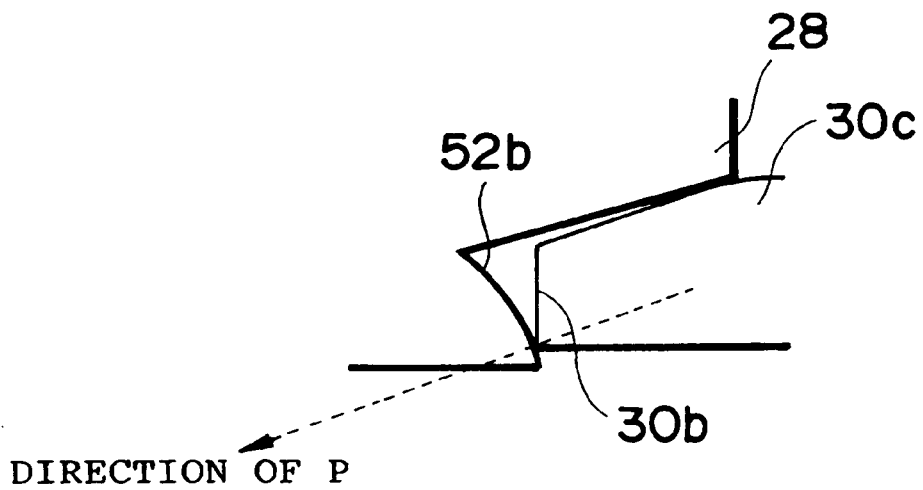

FIGS. 10A and 10B show the first modification and are sectional views of the main part, which respectively correspond to FIGS. 9B and 9D.

The distal end 30b of the sleeve 30 shown in FIGS. 9A to 9D is a tapered surface. In contrast to this, the distal end 30b of the sleeve 30 of the first modification shown in FIGS. 10A and 10B is an annular flat surface set in the same direction as that of the center axis of the sleeve 30. The abutment portion 52b with which the distal end 30b comes into contact is formed into an annular curved surface conforming to part of the virtual spherical surface S centered on the central portion of the major surface P of the light-receiving element PD as in the structure shown in FIGS. 9A to 9d.

According to this structure, in the assembly process, as shown in FIG. 10B, the inner ridge portion of the sleeve distal end 30b is brought into line-contact with the abutment portion 52b, and the direction of the contacting force acting on the line contact portion always coincides with the direction of the major surface P of the light-receiving element PD, so that the center axis of the receiving hole 30d of the sleeve 30 coincides with the direction of the major surface P of the light-receiving element PD. As a result, as in the case shown in FIG. 9A, when the ferrule 50 is fitted in the receiving hole 30d, the light exit end F of the of the optical fiber FL1 always directed to the major surface P, thereby attaining reliable optical axis alignment. In addition, since the distal end 30b of the sleeve 30 is positioned at a predetermined distance from the major surface P, the distance (optical path length) between the light exit end F of the optical fiber FL1 and the major surface P is kept constant, thereby realizing high-precision optical axis alignment between the optical fiber FL1 and the light-receiving element PD.

Figure 11A:
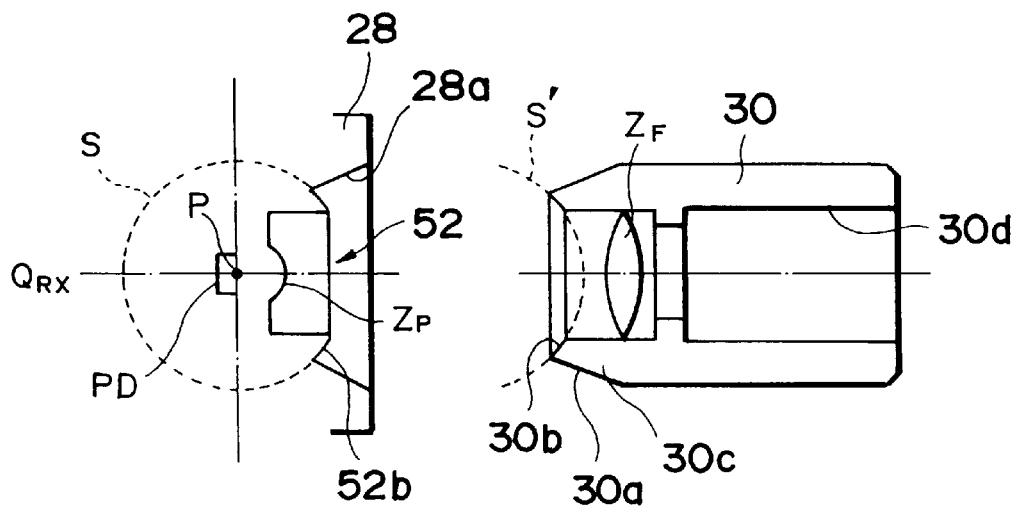
Figure 11B:
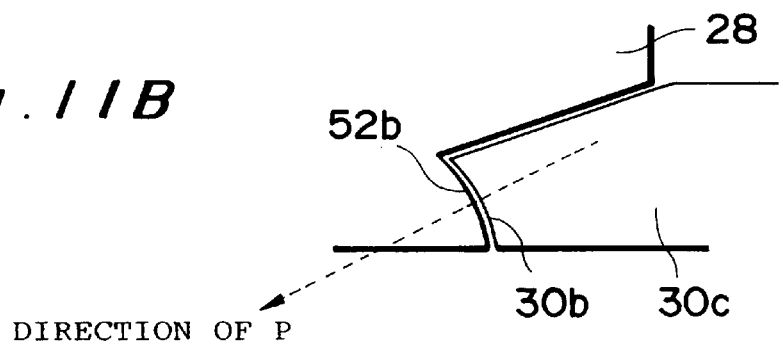
Figure 12:
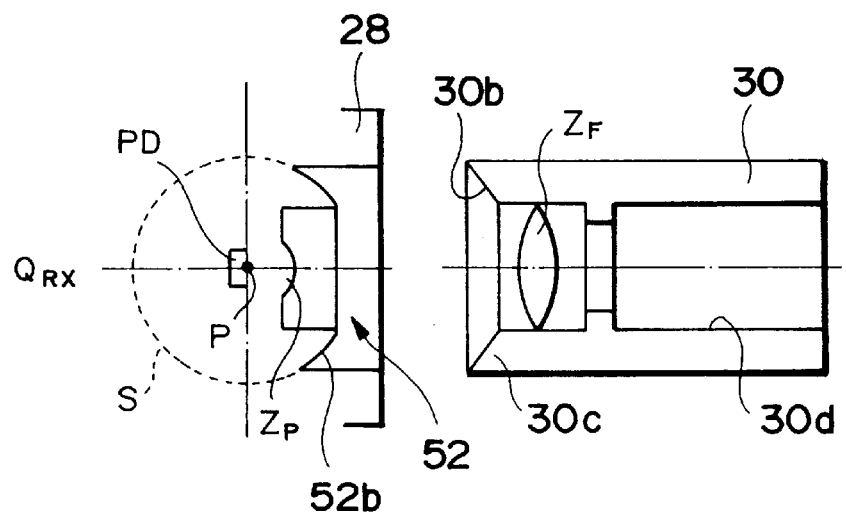
Figure 13:
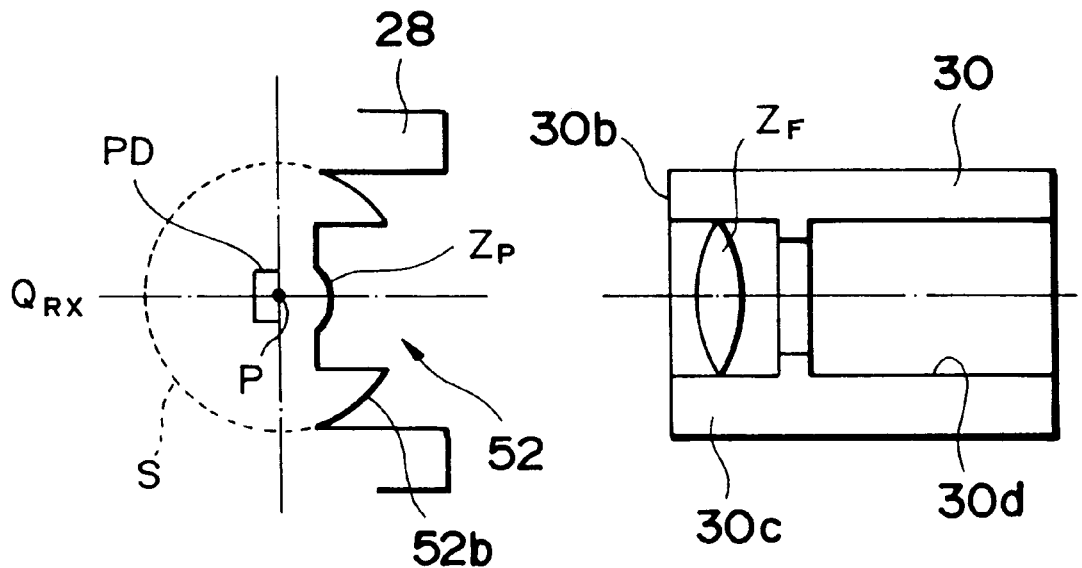
Figure 14:
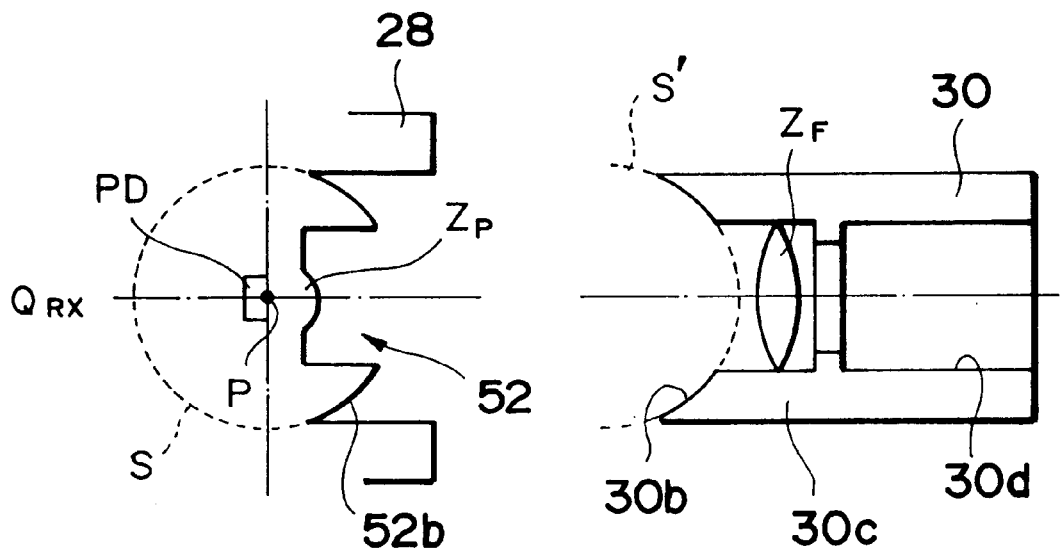

FIGS. 11A and 11B show the second modification of the optical axis alignment mechanism. FIGS. 11A and 11B are sectional views corresponding to those of FIGS. 9A and 9B.

As indicated by the right side of FIG. 11A, when the distal end portion 30c of the sleeve 30 is fitted in the fitting recess portion 52, the abutment portion 52b come into surface-contact with the distal end 30b of the sleeve distal end portion 30c. That is, the abutment portion 52b is molded into a curved surface so as to conform to part of the virtual spherical surface S centered on the major surface P of the light-receiving element PD. The distal end 30b of the sleeve distal end portion 30c is formed into an annular convex surface so as to conform to part of the virtual spherical surface S' centered on the center axis of the receiving hole 30d and having the same diameter as that of the virtual spherical surface S.

According to this structure, in the assembly process, as shown in FIG. 11B, the distal end 30b of the sleeve distal end portion 30c comes into surface-contact with the abutment portion 52b, and the direction of the overall contacting force acting on the surface-contact portion always coincides with the direction of the major surface P of the light-receiving element PD. In addition, the center axis of the receiving hole 30d always coincides with the direction of the major surface P. As in the structure shown in FIG. 9A, therefore, when the ferrule 50 is fitted in the receiving hole 30d, the light exit end F of the optical fiber FL1 is always directed to the major surface P, thereby attaining reliable optical axis alignment. Furthermore, when the distal end 30b of the sleeve 30 comes into contact with the abutment portion 52b, the distal end 30b is always positioned at a predetermined distance from the major surface P. For this reason, the distance (optical path length) between the light exit end F of the optical fiber FL1 and the major surface P is kept constant, thereby attaining high-precision optical axis alignment between the optical fiber FL1 and the light-receiving element PD.

In the structure shown in FIGS. 11A and 11B, both the abutment portion 52b and the distal end 30b of the sleeve distal end portion 30c are formed into the curved surfaces so as to conform to the shapes of the virtual spherical surfaces S and S' to cause them to come into surface-contact with each other. However, the distal end 30b of the sleeve distal end portion 30c may be shaped to conform to the virtual spherical surface S', while the abutment portion 52b may be molded into a cylindrical shape having a peripheral portion spaced equidistantly from the major surface P of the light-receiving element PD. With this structure, the distal end 30b of the curved sleeve distal end portion 30c may be brought into contact with the outer ridge portion of the peripheral portion. Even with this structure, the center axis of the sleeve 30 always coincides with the direction of the major surface P, and the light exit end F of the optical fiber FL1 can always be directed to the major surface P. In addition, the above optical path length can be kept constant.

The third to fifth modifications of the optical axis alignment mechanism will be described below with reference to FIGS. 12A to 14B.

In each of the optical alignment mechanisms shown in FIGS. 9A to 11B, the fitting recess portion 52 has the tapered inner surface 52a, and the sleeve 30 having the tapered outer surface 30a is fitted in the fitting recess portion 52. In contrast to this, in each of the modifications shown in FIGS. 12A to 14B, the fitting recess portion 52 has no tapered inner surface, but is molded into a uniform cylindrical shape centered on the optical axis $Q_{RX}$. The distal end portion 30c of the sleeve 30 is also molded into a shape having a uniform outer diameter. The abutment portion 52b is molded into an annular curved shape to conform to part of the virtual spherical surface S centered on the major surface P of the light-receiving element PD, and the distal end 30b of the sleeve distal end portion 30c is formed into a tapered surface (see FIGS. 12A and 12B), a flat surface (see FIGS. 13A and 13B), or a curved surface (see FIGS. 14A and 14B), as in the structures shown in FIGS. 9A to 11B.

With each of the structures shown in FIGS. 12A to 14B, as in each of the corresponding cases shown in FIGS. 9A to 11B, in the assembly process, when the distal end 30b of the sleeve distal end portion 30c comes into contact with the abutment portion 52b in the fitting recess portion 52, these portions come into line- or surface-contact with each other, and the center axis of the receiving hole 30d of the sleeve 30 coincides with the direction of the major surface P of the light-receiving element PD. As in the structure shown in FIG. 9A, therefore, when the ferrule 50 is fitted in the receiving hole 30d of the sleeve 30, the light exit end F of the optical fiber FL1 is always directed to the major surface P, thereby attaining optical alignment. In addition, since the distal end 30b of the sleeve distal end portion 30c comes into contact with the abutment portion 52b located at a predetermined distance from the major surface P, the distance (optical path length) between the light exit end F of the optical fiber FL1 and the major surface P is kept constant. This structure therefore prevents variations in the optical path length between the optical fiber FL1 and the light-receiving element PD to realize high-precision optical axis alignment.

In the structure shown in FIGS. 14A and 14B, both the abutment portion 52b and the distal end 30b of the sleeve distal end portion 30c are formed into curved surfaces so as to conform to the virtual spherical surfaces S and S', thereby causing them to come into surface-contact with each other. However, the distal end 30b of the sleeve distal end portion 30c may be shaped to conform to the virtual spherical surface S', while the abutment portion 52b may be molded into a cylindrical shape having a peripheral portion spaced equidistantly from the major surface P of the light-receiving element PD. With structure, the distal end 30b of the curved sleeve distal end portion 30c may be brought into contact with the outer ridge portion of the peripheral portion. Even with this structure, the center axis of the sleeve 30 always coincides with the direction of the major surface P, and the light exit end F of the optical fiber FL1 can always be directed to the major surface P. In addition, the above optical path length can be kept constant.

The sixth modification of the optical axis alignment mechanism will be described below with reference to FIG. 15. In each of the modifications shown in FIGS. 9A to 14B, the focusing lens $Z_P$ mounted on the transmission section MW1 is located closer to the light-receiving element PD than the abutment portion 52b. In this structure, therefore, the distal end 30b of the sleeve 30 always comes into contact with the abutment portion 52b at a position closer to the opposite side to the light-receiving element PD side than the focusing lens $Z_P$.

Figure 15:
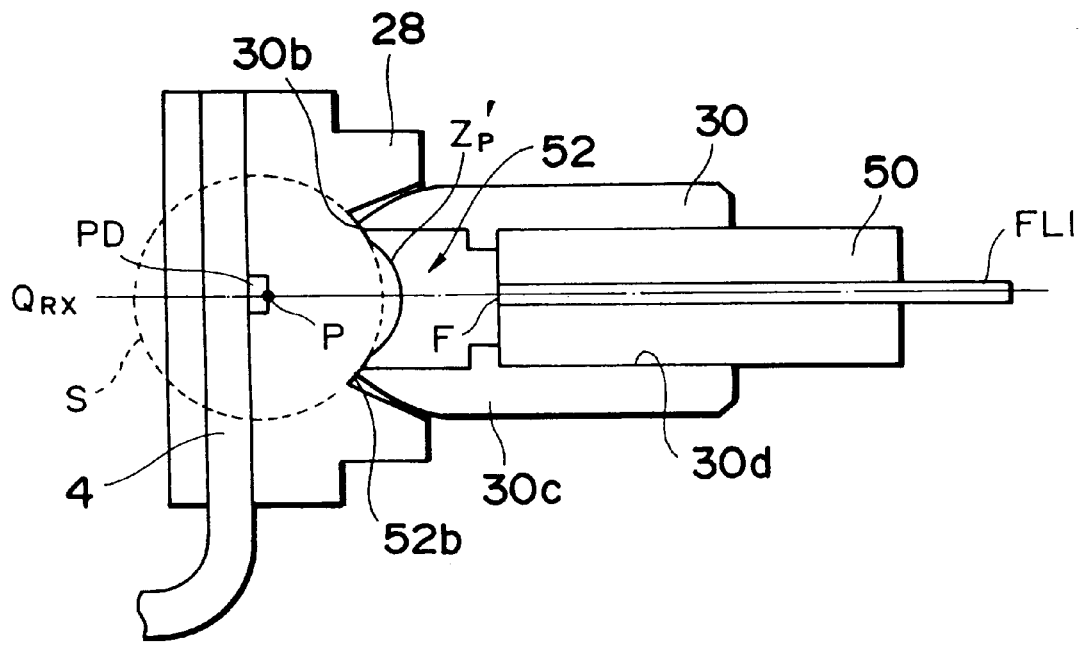

In contrast to this, in the sixth modification shown in FIG. 15, a focusing lens $Z_P'$ more convex to the opening portion side of the fitting recess portion 52 than the abutment portion 52b is integrally molded with the transmission section MW1 in the molding process. However, the abutment portion 52b and the distal end 30b of the sleeve 30 may have the same shapes as those in each of the structures shown in FIGS. 9A to 14B. FIG. 15 representatively shows a modification corresponding to the optical axis alignment mechanism shown in FIGS. 9A and 9B.

In this optical alignment mechanism as well, when the abutment portion 52b is brought into contact with the distal end 30b of the sleeve distal end portion 30c in the assembly process, the center axis of the receiving hole 30d of the sleeve 30 coincides with the major surface P of the light-receiving element PD. When, therefore, the ferrule 50 is fitted in the receiving hole 30d, the light exit end F of the optical fiber FL1 can always be directed to the major surface P, thereby realizing reliable optical axis alignment. In addition, since the sleeve distal end 30b in contact with the abutment portion 52b is positioned at a predetermined distance from the major surface P, the optical path length between the major surface P of the light-receiving element PD and the optical fiber FL1 can be kept constant, thereby realizing high-precision optical axis alignment.

Figure 16:
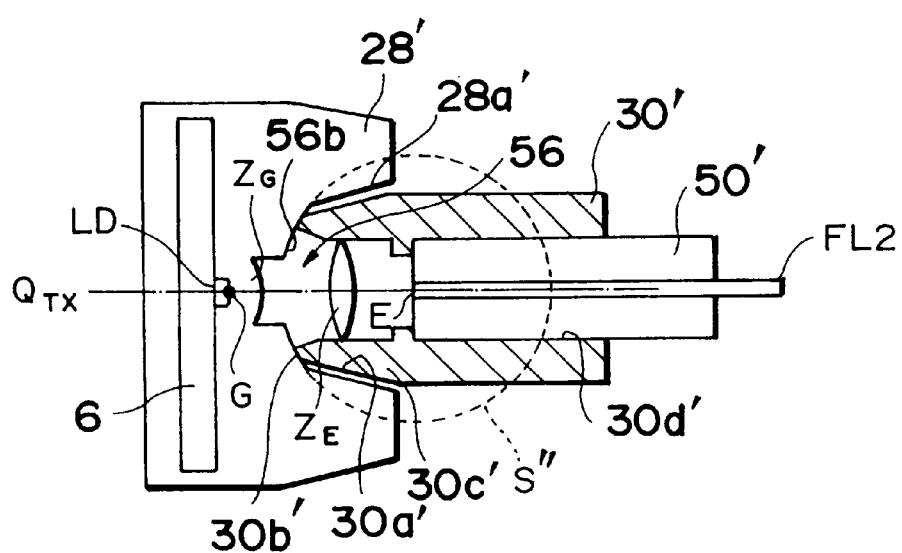

The structure of the optical axis alignment mechanism on the transmission section side will be described next with reference to FIG. 16. FIG. 16 is a sectional view showing a state in which the distal end portion 30c' of the sleeve 30' is fitted in a fitting recess portion 56 molded in the coupling portion 28', and the ferrule 50' is placed in the receiving hole 30d' centered on the axial center of the sleeve 30'. This sectional view is taken along the direction of an optical axis $Q_{TX}$ perpendicular to a light exit surface (major surface) G of the light-emitting element LD facing the coupling portion 28' in FIG. 7.

Referring to FIG. 16, the fitting recess portion 56 in which the distal end portion 30c' of the sleeve 30' is fitted is integrally molded in the coupling portion 28' in the above molding process. In addition, a focusing lens $Z_G$ whose optical axis $Q_{TX}$ coincides with the major surface P of the light-emitting element LD is also integrally molded on the bottom end portion of the fitting recess portion 56. The inner wall of the fitting recess portion 56 is formed into the conical tapered inner surface 28a' which is centered on the optical axis $Q_{TX}$ and gradually decreases in diameter toward the major surface P of the light-emitting element LD. The outer wall 30a' of the sleeve distal end portion 30c' is formed into a tapered outer surface guided by a tapered inner surface 56a. An abutment portion 56b with which a distal end 30b' of the sleeve distal end portion 30c' comes into contact is formed on the inner termination of the tapered inner surface 56a.

The abutment portion 56b is formed into an annular convex surface to conform to part of the shape of a virtual spherical surface S" having a predetermined radius and centered on the light incident end E of the optical fiber FL2 when the ferrule 50' in which the optical fiber FL2 is inserted is fitted in a receiving hole 30d' of the sleeve 30' fitted as shown in FIG. 16. The center axis of the annular abutment portion 56b also coincides with the optical axis $Q_{TX}$. That is, the curved surface of the abutment portion 56b is concentric with the optical axis $Q_{TX}$, and has a curved cross-sectional shape which is concave outward to conform to part of the virtual spherical surface S".

A focusing lens $Z_E$ whose optical axis coincides with the center of the receiving hole 30d' is fixed to the sleeve distal end portion 30c' in advance. In addition, the distal end 30b' is formed into an annular convex surface to conform to part of the shape of the virtual spherical surface S" centered on the center of the light incident end E of the optical fiber FL2.

That is, both the abutment portion 56b and the sleeve distal end 30b' are shaped to conform to part of the shape of the virtual spherical surface S".

In the optical alignment mechanism on the transmission side, which has the above structure, in the assembly process, when the sleeve distal end portion 30c' is fitted in the fitting recess portion 56 to bring the distal end 30b' into contact with the abutment portion 56b, the distal end 30b' is substantially brought into surface-contact with the abutment portion 56b. As a result, the center axis of the sleeve 30' always coincides with the direction of the major surface G of the light-emitting element LD. With this structure, when the ferrule 50' is fitted in the receiving hole 30d' of the sleeve 30', a light incident end E of the optical fiber FL2 coincides with the direction of the major surface G. In addition, the optical path length corresponding to the total distance of the distance between the light incident end E of the optical fiber FL2 and the abutment portion 56b and the distance between the abutment portion 56b and the major surface G of the light-emitting element LD is always kept constant.

According to this optical axis alignment mechanism, the light incident end E of the optical fiber FL1 can be directed to the major surface G of the light-emitting element LD, and the optical path length can be kept constant, thereby realizing reliable, high-precision optical axis alignment.

Figure 17:
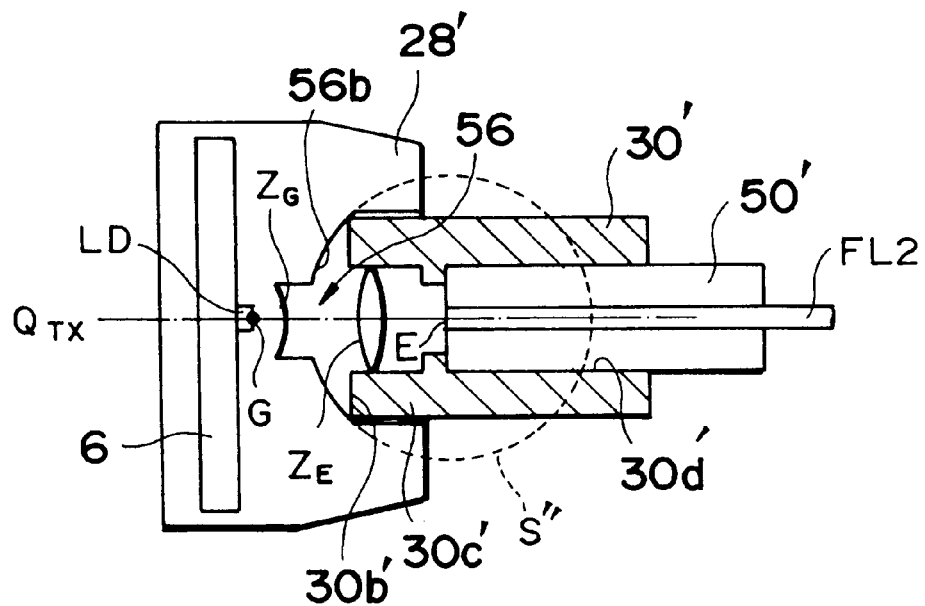

The first modification of the optical axis alignment mechanism on the transmission section side will be described next with reference to FIG. 17. The optical axis alignment mechanism shown in FIG. 17 differs from that shown in FIG. 16 in that the inner wall of a fitting recess portion 56 is not molded into a tapered inner surface but is molded into a cylindrical shape parallel along an optical axis $Q_{TX}$, and a distal end portion 30c' of the cylindrical sleeve 30' having no tapered outer surface is inserted in the fitting recess portion 56.

As in the mechanism shown in FIG. 16, an abutment portion 56b is formed into an annular concave surface so as to conform to part of the shape of a virtual spherical surface S" having a predetermined radius and centered on the center of the light incident E of the optical fiber FL2 when the ferrule 50' is fitted in a receiving hole 30d40 of the sleeve 30'. That is, the concave surface of the abutment portion 56b is concentric with the optical axis $Q_{TX}$, and has a curved cross-sectional shape which is concave outward so as to conform to part of the virtual spherical surface S".

In the assembly process, when a distal end 30b' of the sleeve distal end portion 30c' is brought into contact with the abutment portion 56b, the outer edge portion of the distal end 30b' is substantially brought into line-contact with the abutment portion 56b. As a result, the center axis of the receiving hole 30d' of the sleeve 30' coincides with the direction of the major surface G of the light-emitting element LD. In addition, since the optical path length from the major surface G to the light incident end E of the optical fiber FL2 is kept constant, accurate, high-precision optical axis alignment can be attained.

Figure 18:
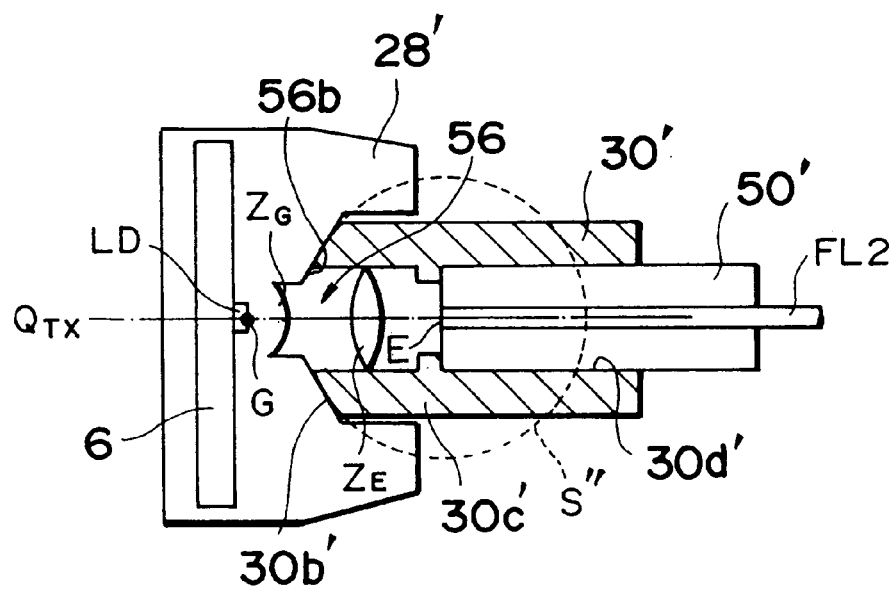

The second modification of the optical axis alignment mechanism on the transmission section side will be described next with reference to FIG. 18. Referring to FIG. 18, an abutment portion 56b has a conical tapered wall which gradually decreases in radius toward a major surface G centered on an optical axis $Q_{TX}$. A distal end 30b' of a distal end portion 30c40 of the sleeve 30' is formed into an annular convex surface so as to conform to part of the shape of a virtual spherical surface S" having a predetermined radium and centered on the center of a light incident end E of the optical fiber FL2 inserted in a ferrule 50' when the ferrule 50' is fitted in a receiving hole 30d', as shown in FIG. 18. That is, the abutment portion 56b is concentric with the optical axis $Q_{TX}$, and has a flat cross-sectional shape. The sleeve distal end 30b' is formed into an outwardly convex annular curved surface conforming to part of the shape of the virtual spherical surface S".

According to the optical axis alignment mechanism having this structure as well, in the assembly process, when the distal end 30b' of the sleeve distal end portion 30c' is brought into contact with the abutment portion 56b, they are brought into line-contact with each other in an annular form. In addition, since the center axis of the sleeve 30' and the light incident end E of the optical fiber FL2 can be made to always coincide with the direction of the major surface G of the light-emitting element LD, and the optical path length between the major surface G and the light incident end E can be kept constant, reliable, high-precision optical axis alignment can be realized.

A modification of the sleeve in each of the optical axis alignment mechanisms on the reception and transmission section sides described above will be described next with reference to FIGS. 19A and 19B. Note that the sleeve 64 shown in FIGS. 19A and 19B is shaped to be applicable to the optical axis alignment mechanisms on the reception and transmission section sides, and hence will be described below as an typical example.

Each of the distal ends 30b and 30b' of the sleeves 30 and 30' in FIGS. 9A to 18 has an annular shape, and each of the abutment portions 52b and 56b also has an annular shape. When, therefore, the distal ends 30b and 30b' come into contact with the abutment portions 52b an 56b, they come into line- or surface-contact with each other along the circumferential direction as a whole because the annular shapes.

Figure 19A:
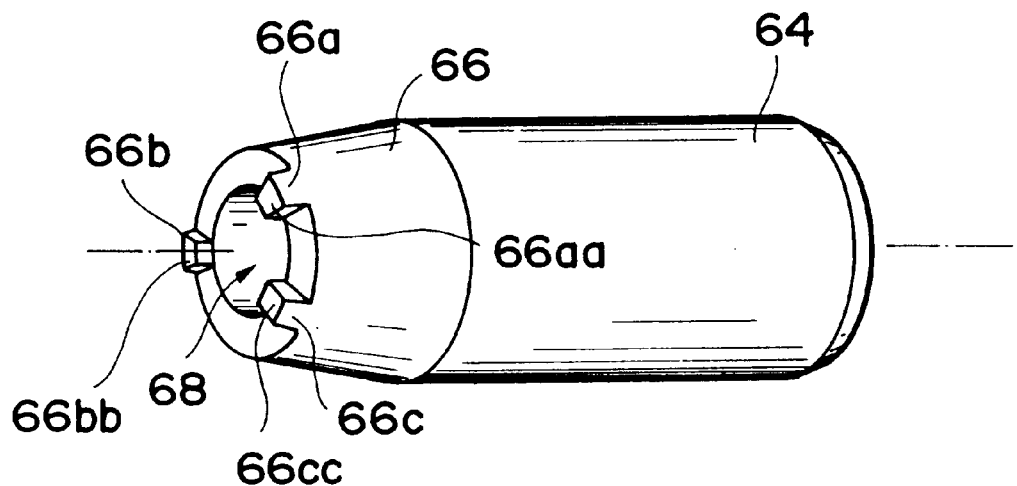
FIGS. 19A and 19B are views for explaining a modification of the sleeve in each of the optical axis alignment mechanisms.
Figure 19B:
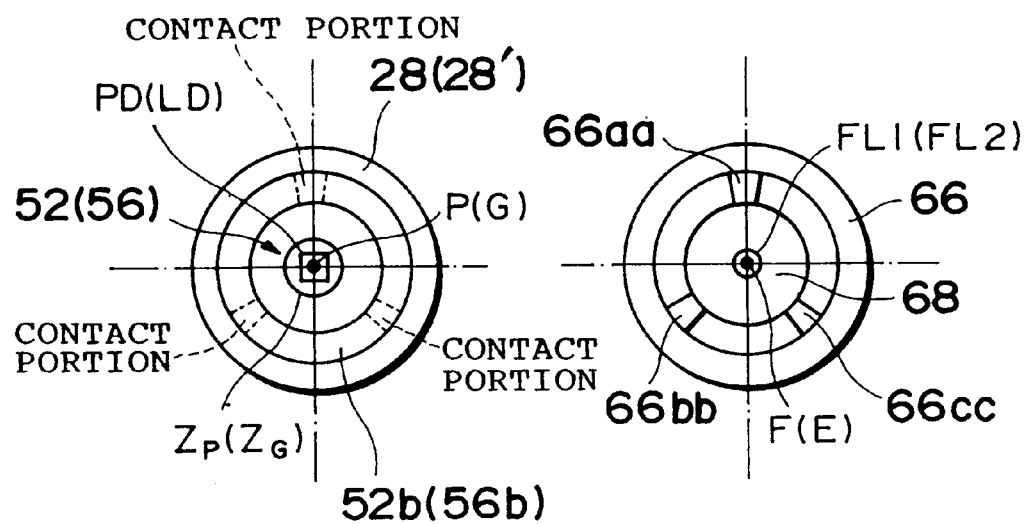

In contrast to this, a plurality of (three in this case) projections 66a, 66b, and 66c are formed at equal intervals on a distal end portion 66 of a sleeve 64 in FIGS. 19A and 19B which are centered on the central axis. In addition, distal ends 66aa, 66bb, and 66cc of the projections 66a, 66b, and 66c are aligned with a virtual plane perpendicular to the center axis. In other words, the projections 66a, 66b, and 66c have the same height in the direction of the center axis.

Each of the distal ends 66aa, 66bb, and 66cc may be shaped to have a tapered surface, a flat surface, or a curved surface on the basis of the same principle as that of each of the distal ends 30b and 30b' of the sleeves 30 and 30' in FIGS. 9A to 18. That is, each of the distal ends 66aa, 66bb, and 66cc may have a shape partly similar to that of each of the distal ends 30b and 30b' in FIGS. 9A to 18, even though the area of each of the distal ends 66aa, 66bb, and 66cc is small.

More specifically, when the sleeve 64 is to be formed in correspondence with the sleeve 30 in the optical axis alignment mechanism shown in FIGS. 9A to 9D, each of the distal ends 66aa, 66bb, and 66cc of the sleeve 64 is formed to have a tapered surface partly similar to the shape of the distal end 30b of the sleeve 30.

According to this modification, when the sleeve 64 formed in correspondence with each of the forms shown in FIGS. 9A to 18 is inserted in the fitting recess portion 52 of the reception section or the fitting recess portion 56 of the transmission section, and each of the distal ends 66aa, 66bb, and 66cc is brought into contact with the abutment portion 52b or the abutment portion 56b, they are brought into contact with each other at three portions in relatively narrow areas, as shown in FIG. 19B corresponding to FIG. 9C. That is, the distal ends substantially come into contact with the abutment portion at three points. The contacting forces at the three points are made uniform to allow the sleeve 64 to be mounted in a stable state.

In addition, since the center axis of the receiving hole 68 of the sleeve 64 is directed to the major surface P of the light-receiving element PD or the major surface G of the light-emitting element LD, optical alignment between the end face F or E of the optical fiber FL1 or FL2 and the major surface P or G can be reliably performed with high precision by fitting the ferrule 50 or 50' in the receiving hole 68.

In this modification, the projections 66a, 66b, and 66c are formed on the sleeve 64, and the flush annular surfaces of the abutment portions 52b and 56b of the coupling portions 28 and 28' remain the same. In contrast to this, the annular distal end 30b or 30b' of the sleeve in FIGS. 9A to 19B may remain the same, and projections corresponding to the projections 66a, 66b, and 66c in FIGS. 19A and 19B may be formed on the coupling portion 28 or 28', thereby realizing substantial point-contact by using the projections. When, however, projections are formed on the abutment portions of the coupling portions 28 and 28', the distal ends of the these projections must be formed to have shapes partly similar to the shapes of the abutment portions 52b and 56b in FIGS. 9A to 18.

With the use of each of the optical axis alignment mechanisms described with reference to FIGS. 9A to 19B, a structure in which no deterioration in optical axis alignment is caused by positional and angular shifts between the conversion elements and the optical fibers can be obtained. Even if a position or angular shift occurs, since the optical fibers are always directed to the major surfaces P and G of the conversion elements PD and LD by bringing the sleeves 30, 30', and 64 into contact with the abutment portions 52b and 56b, reliable, high-precision optical axis alignment can be attained.

In addition, since these mechanisms are formed within small areas (the absolute values of the sizes are small) around the optical systems of the reception and transmission sections, the precision required for each part is relatively low. Therefore, these devices can be easily manufactured by resin molding or the like, resulting in a low manufacturing cost.

All the modifications shown in FIGS. 9A to 19B include the focusing lenses $Z_P$ and $Z_G$ on the conversion element PD/LD side and the focusing lenses $Z_F$ and $Z_E$ in the sleeves 30, 30', and 64. However, the present invention is not limited to the structure having focusing lenses on both the sides. That is, the optical data link may have only the focusing lenses $Z_P$ and $Z_G$ on the conversion element PD/LD side, or the focusing lenses $Z_F$ and $Z_E$ in the sleeves 30, 30', and 64.

To efficiently couple the signal light $H_{RX}$ sent through the optical fiber FL1 to the light-receiving element PD, it is preferable that the reception section include the focusing lens $Z_F$ on the sleeve 30 side, and selectively have the focusing lens $Z_P$ on the light-receiving element PD side. To efficiently couple the signal light $H_{TX}$ emerging from the light-emitting element LD to the optical fiber FL2, it is preferable that the transmission section include the focusing lens $Z_G$ on the coupling portion 28 side, and selectively include the focusing lens $Z_E$ on the sleeve 30' side.

In this modification, the abutment portions 52b and 56b are molded in the fitting recess portions 52 and 56. However, it is not essential to the present invention that side walls such as the tapered surface 52a are formed on the fitting recess portions 52 and 56. In the present invention, the abutment portions 52b and 56b molded on the coupling portions 28 to have predetermined shapes and the sleeves 30 and 30' are brought into contact with each other to attain an improvement in assembly precision. Therefore, side walls for guiding and positioning the sleeves 30 and the like are not essential to the present invention, but are formed in accordance with specifications.

In the above embodiments, the sleeve 30 is formed independently of the transmission/reception unit TRU, and the transmission/reception unit TRU and the sleeve 30 are integrated into a unit and mounted in the housing 32. However, when the first and second conversion element mounting portions 4 and 6 of the lead frame are molded with the first resin, a sleeve portion having the same structure as that of the sleeve 30 may be integrally molded together.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

The basic Japanese Applications No. 223931/1996(8-223, 931) filed on Aug. 26, 1996, No. 264812/1996(8-264,812) filed on Oct. 4, 1996, and No. 200076/1997(9-200076) filed on Jul. 25, 1997 are hereby incorporated by reference.

What is claimed is:

1. An optical data link for connecting an optical fiber transmission path to an electrical signal transmission path, comprising:

a conversion element for converting one of an optical signal transmitted through said optical fiber and an electric signal transmitted through said electrical signal transmission path into the other signal;

a lead frame comprising:

a metal planar member having a conversion element mounting portion on which said conversion element is mounted, and an electronic element mounting portion on which electronic elements constituting an electronic circuit are mounted;

external lead pins for external connection electrically connected to said electronic element mounting portion; and lead pins electrically connected to one end of said conversion element and to said electronic element mounting portion;

a coupling portion for optically coupling said optical fiber to said conversion element; and a focusing portion whose optical axis extends in the direction of the normal to a major surface of said conversion element, wherein said coupling portion and said focusing portion are molded integrally with said conversion element mounting portion with a first resin for sealing said conversion element, and wherein said electronic elements are sealed with a second resin which is molded on said electronic element mounting portion separately from said first resin molded on said conversion element mounting portion.

2. A link according to claim 1, wherein said lead frame further comprises a peak or valley portion formed by bending a portion exposed between said first resin and said second resin in the form of a hook with respect to a major surface of said second resin.

3. A link according to claim 2, wherein an angle of the hook-like bent portion of said lead frame on the second resin side is not less than 90°.

4. A link according to claim 1, wherein said coupling portion comprises:

a sleeve for holding said optical fiber; and an abutment portion conforming to part of a shape of a virtual spherical surface centered on a central portion of a light-receiving surface of one of said optical fiber and said conversion element optically coupled to each other, which is located on a light-receiving side, and coming into contact with a distal end portion of said sleeve.

5. A link according to claim 1, wherein said coupling portion comprises:

a sleeve having an end portion conforming to part of a shape of a virtual spherical surface centered on a central portion of a light-receiving surface of one of said optical fiber and said conversion element optically coupled to each other, which is located on a light-receiving side, and holding said optical fiber; and an abutment portion located at a predetermined distance from the major surface of said conversion element and coming into contact with said sleeve.

6. An optical data link for connecting an optical fiber transmission path to an electrical signal transmission path, comprising:

a first conversion element for converting an optical signal transmitted through a first optical fiber into an electrical signal;

a second conversion element for converting an electrical signal transmitted through said electrical signal transmission path into an optical signal and sending the optical signal to a second optical fiber;

a lead frame comprising:

a metal planar member having conversion element mounting portions on which said first and second conversion elements are mounted, and an electronic element mounting portion on which electronic elements constituting an electronic circuit are mounted; external lead pins for external connection; and lead pins electrically connected to one end of said first conversion element and one end of said second conversion element;

a first coupling portion for optically coupling said first optical fiber to said first conversion element;

a first focusing portion whose optical axis extends in the direction of the normal to a major surface of said first conversion element;

a second coupling portion for optically coupling said second optical fiber to said second conversion element; and a second focusing portion whose optical axis coincides with a major surface of said second conversion element, wherein said first and second coupling portions and said first and second focusing portion are integrally molded on said conversion element mounting portions with a first resin which is used to seal said first and second conversion elements, and wherein said electronic elements are sealed with a second resin which is molded on said electronic element mounting portion separately from said first resin molded on said conversion element mounting portion.

7. A link according to claim 6, wherein said lead frame further comprises a peak or valley portion formed by bending a portion exposed between said resin and said second resin in the form of a hook with respect to a major surface of said second resin.

8. A link according to claim 7, wherein an angle of the hook-like bent portion of said lead frame on the second resin side is not less than 90°.

9. A link according to claim 6, wherein said coupling portion comprises:

a sleeve for holding said optical fiber; and an abutment portion conforming to part of a shape of a virtual spherical surface centered on a central portion of a light-receiving surface of one of said optical fiber and said conversion element which are optically coupled to each other, which is located on a light-receiving side, and coming into contact with a distal end portion of said sleeve.

10. A link according to claim 6, wherein said coupling portion comprises:

a sleeve having an end portion conforming to part of a shape of a virtual spherical surface centered on a central portion of a light-receiving surface of one of said optical fiber and said conversion element optically coupled to each other, which is located on a light-receiving side, and holding said optical fiber; and an abutment portion located at a predetermined distance from the major surface of said conversion element and coming into contact with said sleeve.

11. A method of manufacturing an optical data link for connecting an optical fiber to an electrical signal line, comprising:

mounting a conversion element on a conversion element mounting portion prepared on a predetermined portion of a lead frame, said conversion element being adapted to convert one of an optical signal transmitted through said optical fiber and an electrical signal transmitted through said electrical signal transmission path into the other signal and outputting the signal, wherein said lead frame comprises:

a metal planar member having a conversion element mounting portion on which said conversion element is mounted and an electronic element mounting portion on which electronic elements constituting an electronic circuit are mounted;

external lead pins electrically connected to said electronic element mounting portion; and lead pins electrically connected to one end of said conversion element and to said electronic element mounting portion;

mounting an electronic element on an electronic element mounting portion prepared on a predetermined portion of said lead frame which is exposed from said first resin;

sealing said conversion element with a first resin, and integrally molding a coupling portion for optically coupling said optical fiber to said conversion element and a focusing portion whose optical axis extends in the direction of the normal to a major surface of said conversion element on the conversion element mounting portion; and sealing said electronic element with a second resin, and integrally molding said conversion element mounting portion independently of said first resin.

12. A method according to claim 11, further comprising the step of forming a peak or valley portion by bending a portion of said lead frame which is exposed between said first and second resins in the form of a hook.

13. A method according to claim 12, wherein an angle of the hook-like bent portion-of said lead frame on the second resin side is not less than 90°.

14. A method according to claim 11, wherein molding of said first resin into said conversion element mounting portion and molding of said second resin into said electronic element mounting portion are simultaneously performed.

* * * * *